United States Patent [19]
Geiersbach et al.

[11] 3,784,888
[45] Jan. 8, 1974

[54] CONTROL FOR COMMUTATORLESS MOTOR

[75] Inventors: Allois F. Geiersbach, Milwaukee; Frederick A. Stich, Hales Corners, both of Wis.

[73] Assignee: Allis-Chalmers Corporation, Milwaukee, Wis.

[22] Filed: June 26, 1972

[21] Appl. No.: 266,286

[52] U.S. Cl. ............................. 318/138, 318/227
[51] Int. Cl. ............................................. H02k 29/00
[58] Field of Search.................... 318/138, 171, 227, 318/230, 231

[56] References Cited
UNITED STATES PATENTS

| | | | |
|---|---|---|---|
| 3,678,358 | 7/1972 | Kolatorowicz | 318/138 |
| 3,418,550 | 12/1968 | Kolatorowicz et al. | 318/138 |
| 3,483,458 | 12/1969 | Kirk | 318/138 |

*Primary Examiner*—Gene Z. Rubinson
*Attorney*—Lee H. Kaiser et al.

[57] ABSTRACT

Three stator phase windings of a commutatorless motor are energized from a battery through power transistors. A capacitive rotor position sensor coupled to the motor rotor derives three phase square wave rotor position signals displaced 120° apart at a frequency proportional to motor speed. Three sets of logic gates receive rotor position signals as inputs and control the conduction interval of the transistors. When a motor direction switch is actuated forward, first gates of the three logic sets are opened to enable the transistors during first rotor position signals displaced 120° to generate a clockwise rotating stator field, and when the direction switch is actuated to the reverse position, second gates are opened to enable the transistors during second rotor position signals displaced 180° from the first signals to thereby shift the stator field 180° and thus reverse rotor direction. Third gates of the logic sets are opened when the motor attains a predetermined speed to enable the transistors during rotor position signals shifted 60° from the first signals to thereby vary the motor torque angle. A plurality of timing pulses are generated during each rotor position signal, variable delay means generate delay pulses from the timing pulses after a selectively adjustable time delays the delay pulses open delay gates disposed between the logic gates and the power transistors, and motor speed controlling means vary the time delay between the timing and delay pulses to thereby change the power duty cycle of the power transistors and thus control motor speed and torque.

52 Claims, 20 Drawing Figures

CONTROL FOR COMMUTATORLESS MOTOR

This invention relates to commutatorless motors and more particularly to a control for a variable speed commutatorless motor.

BACKGROUND OF THE INVENTION

Commutation in a conventional direct current motor is essentially a mechanical switching operating in which brushes and a segmented commutator cyclically reverse current through the armature conductors in a sequence as a function of rotor position, and such commutation results in friction wear and sparking with attendant generation of radio frequency noise. In order to eliminate such defects, commutatorless D.C. motors have been developed provided with electronic commutation means for controlling the armature current in accordance with the rotational position of the rotor. Brushless D.C. motors are also known which employ a permanently magnetized rotor and wherein the stator windings are energized in a cyclical sequence through semiconductor power switches which are sequentially gated in accordance with the rotational position of the rotor. Variable speed synchronous motors are also known wherein a synchro coupled to the motor rotor derives phase-displaced sine wave control signals at a frequency proportional to motor speed which regulate a cycloconverter for energizing the stator windings, and the phase angle and magnitude of the control signals are varied as a function of motor speed to advance motor torque angle at higher motor speeds.

Prior art commutatorless motor controls which use optical or magnetic rotor position sensors are, in general, unnecessarily expensive and complicated and have relatively low sensitivity and relatively high temperature drift. Known commutatorless motor controls using magnetic rotor position sensors have problems with D.C. offsets, while those employing optical rotor position sensors have problems with dirt and vibration. Also, prior art controls for brushless D.C. motors do not have the desirable torque and speed characteristics of conventional direct current motors, while known controls for variable speed synchronous motors either require complicated and expensive synchros for generating phase-displaced sine wave control signals or necessitate complicated and expensive analog circuits.

OBJECTS OF THE INVENTION

It is an object of the invention to provide a torque angle control for an adjustable speed synchronous motor which is simpler and less expensive than prior art devices.

Another object of the invention is to provide an improved control for an adjustable speed synchronous motor which can be regulated over the entire speed range using only two discrete torque angles.

A further object is to provide an improved torque angle control for an adjustable speed commutatorless motor which eliminates the expensive analog circuits required by prior art controls and utilizes digital circuits to shift torque angle and to reverse motor direction.

Still another object of the invention is to provide an improved control for an adjustable speed commutatorless motor using a rotor position sensor which generates square wave signals indicative of rotor position and which eliminates the expensive prior art synchros which derived phase-displaced sine wave control signals indicative of rotor position.

A still further object of the invention is to provide an improved control for a commutatorless motor wherein square wave rotor position signals control the conduction interval of semiconductor power switches which energize the stator winding and in sequence which keeps the rotor poles in synchronism with the rotating stator field. Another object is to provide such a control wherein the rotor position signals during which the power switches are enabled can easily be changed to vary motor torque angle as a function of motor speed and/or to reverse motor direction. Still another object is to provide such a control having novel means to inhibit 180 phase shift of the stator field when the motor is rotating above a predetermined speed and the motor direction switch is reversed and which, under such conditions, permits the power switches to conduct during rotor position signals which result in braking of the motor.

A still further object of the invention is to provide an improved control for a commutatorless motor wherein different rotor position signals control the conduction interval of the power switches and having novel means to control the power duty cycle of the power switches in order to adjust motor speed and torque.

Still another object of the invention is to provide an improved control for commutatorless motors having electronic commutation means for controlling armature current in accordance with the rotational position of the rotor and which has speed and torque characteristics comparable to those of a conventional D.C. motor while eliminating the above disadvantages of mechanical commutation. Another object of the invention is to provide an improved control for a commutatorless motor which has high stall torque and operates over a wide speed range with smooth control of speed. A still further object of the invention is to provide an improved control for a commutatorless motor which permits smooth regenerative braking and smooth reversal of the direction of motor rotation. Still another object is to provide such a commutatorless motor control in which efficiency is high, which is relatively low in cost and simple to manufacture, and wherein relatively simple digital circuits control sequential energization of the stator windings. A further object of the invention is to provide such an improved control for a commutatorless motor which is particularly adapted to drive a vehicle and which, upon failure of a power switch, will not cause the vehicle to become uncontrollable but rather will still drive the vehicle to a repair area.

SUMMARY OF THE INVENTION

A commutatorless electric motor having n phase stator windings is energized, in accordance with the invention, from a power source through controllable semiconductors (power swtiches) which are enabled to conduct during rotor position signals displaced $360/n$ electrical degrees apart derived by a rotor position sensor coupled to the motor rotor to generate a rotating magnetic field within the stator. A logic gate set associated with each phase winding comprises a plurality of logic gates which respectively receive different square wave rotor position signals as inputs and have their outputs commoned and coupled to the associated power switch. Means responsive to actuation of a motor direction swtich to forward position opens first gates of the n logic gate sets to enable the power swtiches during first rotor position signals displaced 360/n electrical degrees which generate a rotating magnetic field within the stator, and is responsive to actuation of the switch in the reverse direction to open second gates to enable the power switches during second rotor position signals displaced 360/n degrees and also displaced 180° from the first signals to thereby shift the stator field 180 electrical degrees and thus reverse motor direction. A speed signal is derived when the rotor angular velocity exceeds a predetermined magnitude, and means responsive to the speed signal opens third gates to enable the power switches during third rotor position signals displaced 60° from the first signals to change the motor torque angle as a function of motor speed.

Delay gates are disposed between the logic gates and the power switches. A plurality of timing pulses are generated during each rotor position signal. Variable delay means generates a delay pulse from each timing pulse after a time delay. The delay pulses open the delay gates to turn on the power switches, and the variable delay means retard opening of the delay gates, and thus delay initiation of power switch conduction, to vary the duty cycle of the power switches and thereby control motor speed and torque.

In the preferred embodiment each stator phase winding has a center tap with the two windings halves joined at the center tap oppositely polarized and each being connected in series with a power switch. The rotor position sensing means derives n square wave rotor position signals displaced 360/n degrees apart and their complements, and the power switches associated with the oppositely polarized halves of each stator phase winding are enabled respectively by complementary rotor position signals so that they operate in push-pull.

DESCRIPTION OF THE DRAWINGS

These and other objects and advantages of the invention will be more readily apparent from the following detailed description when considered in conjunction with the accompanying drawing wherein:

FIG. 3b illustrates the train of 60° spaced apart timing pulses P from the synchronous pulse generator whose frequency is a function of motor speed; FIG. 3c illustrates the train of delay pulses P' after they have been delayed 30° in the variable delay circuit; FIG. 3d illustrates the "logic" signals c2 from delay gating circuit 22 fed over lead C2 to interface circuit IFC2 as a result of the delay pulses P' shown in FIG. 3c; and FIG. 3e illustrates the current pulses CC2 conducted by power switch PSC2 as a result of the logic signals c2 shown in FIG. 3d;

DETAILED DESCRIPTION

Figure 1:
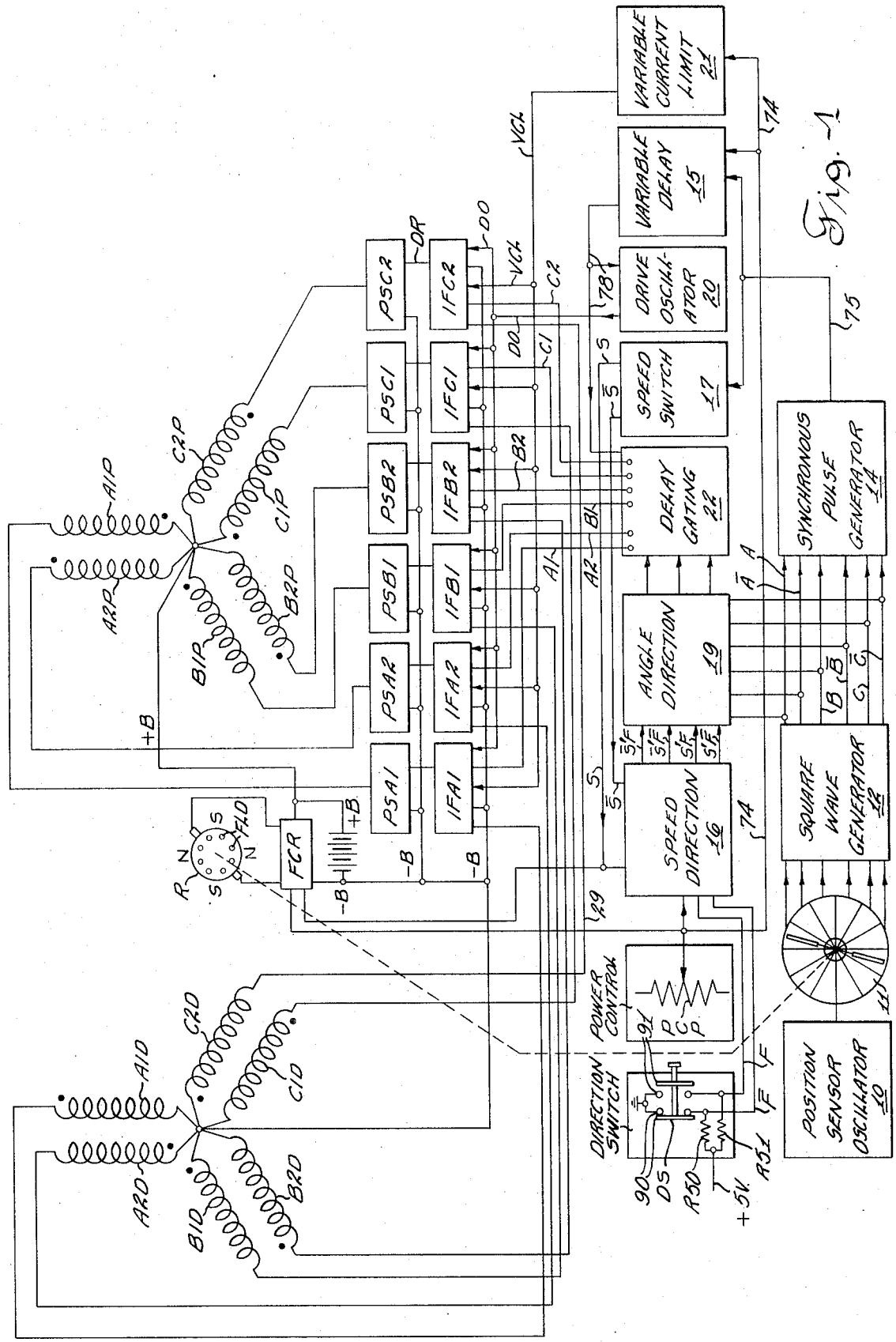
FIG. 1 is a schematic diagram in block form of the commutatorless motor control of a preferred embodiment of the invention.

Referring to the drawing, the motor of the preferred embodiment of the invention may have the frame (not shown) of a conventional synchronous motor with the stator winding schematically shown in FIG. 1 similar to that of a three-phase, wye connected, push-pull transformer. The stator has one centertapped winding per phase, and the wye configuration is made by connecting together the center taps of the three phase windings. Stator phase A winding comprises a winding section A1P, termed a "power winding," connected in series with an oppositely polarized winding section, or power winding A2P and with the center tap therebetween connected to the positive terminal of the battery and being commoned to the center tap between power windings B1P and B2P of phase B stator winding and also common to the center tap between power windings C1P and C2P of phase C stator winding. (In this system of notation, the first symbol designates the phase, the second symbol designates the polarity group, and the third signal designates the type of winding, power or drive). The two power windings (i.e., winding sections) of each phase stator winding are of opposite polarity, e.g., winding A1P is of opposite polarity to winding A2P, winding B1P is oppositely polarized from winding B2P. Each power winding A1P, A2P, B1P, B2P, C1P, and C2P is connected to a power switch which preferably is a silicon transistor, e.g., power winding A1P is coupled to the collector of power switch PSA1, power winding A2P is coupled to the collector of power switch PSA2, etc. Only one power switch PSC2 is shown in detail in FIG. 9.

When the two power switches of a phase, such as PSA1 and PSA2 of phase A, are operated alternately to energize the oppositely polarized power windings such as A1P and A2P, the direction of magnetic flux in the motor stator is reversed, even though the direction of current from the battery through windings A1P and A2P is unchanged. Thus the power winding of each phase, such as A1P and A2P of the phase A stator winding, in conjunction with the associated power switches PSA1 and PSA2 are arranged in push-pull in a manner similar to a push-pull converter. Because of the polarities of the two power windings per phase, such as A1P and A2P, each carrying unidirectional current, an alternating flux is established in each phase of the motor stator, and the six power switches PSA1, PSA2, PSB1, PSB2, PSC1 and PSC2 conduct at the correct time to maintain the desired direction rotational velocity of the stator rotating magnetic field.

The motor rotor R is shown schematically in FIG. 1 and may be similar to a conventional synchronous motor rotor with four non-salient field poles and a field winding FLD energized with direct current from a field current regulator FCR described hereinafter to generate a direct current magnetic field which reacts with the rotating magnetic field generated by the stator power windings A1P-C2P to produce torque on the rotor R. FIG. 1 illustrates that the rotor field winding FLD is energized through brushes, but it will be appreciated that brushes may be eliminated if the field winding is energized from a unidirectional source including a rotating transformer (not shown) having the transformer secondary winding and the rectifiers mounted on the motor rotor in the manner disclosed in U.S. Pat. No. 3,351,396 to La Rose having the same assignee as this invention or if the motor is of the synchronous inductor type wherein magnetic poles are generated in a windingless ferromagnetic rotor by a field winding or the stator such as disclosed in U.S. Pat. No. 3,584,276 to W. L. Ringland et al.

The motor stator also has a center-tapped "base drive" winding in each phase with the center taps connected in wye to provide six winding sections, termed "drive" windings A1D, A2D, B1D, B2D, C1D, and C2D each of which is inductively linked with the corresponding power winding of the same phase, e.g., drive winding A1D is inductively linked to power winding A1P, etc. The drive windings of each phase are of opposite polarity, e.g., winding A1D is oppositely polarized from winding A2D, and each drive winding supplies base drive power to the corresponding transistor power switch and derives such power from the corresponding power winding by transformer action.

POWER SWITCH

Figure 9:
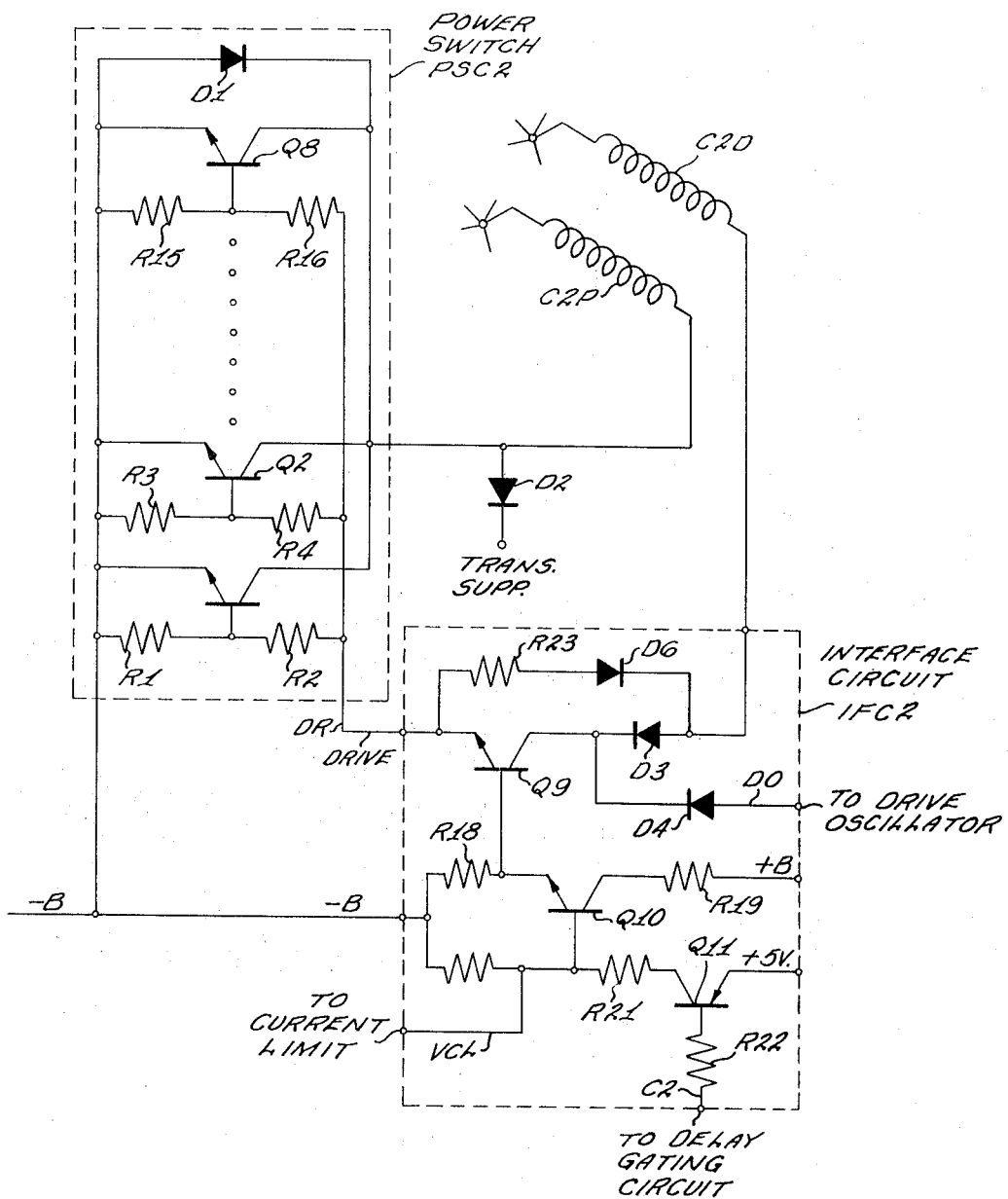
FIG. 9 is a schematic wiring diagram of power switch PSC2 and interface circuit IFC2.
Figure 10:
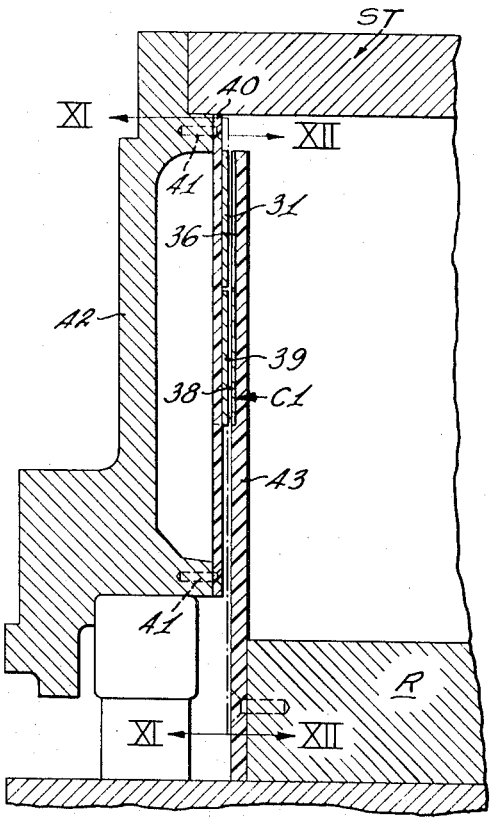
FIG. 10 is a partial cross section view through a preferred embodiment of the capacitive position sensor.
Figure 11:
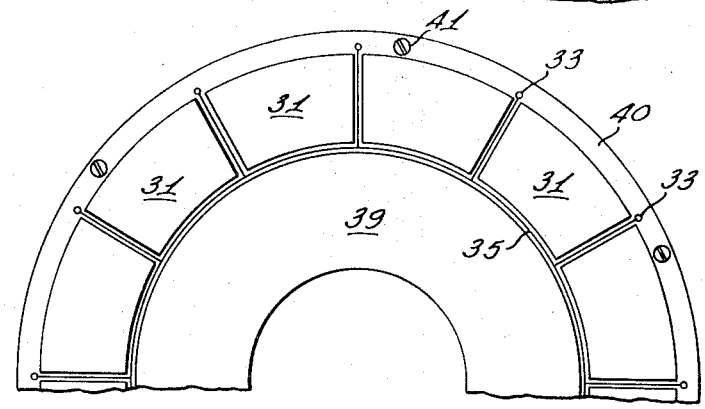
FIGS. 11 and 12 are views taken along lines XI—XI and XII—XII respectively of FIG. 10.
Figure 12:
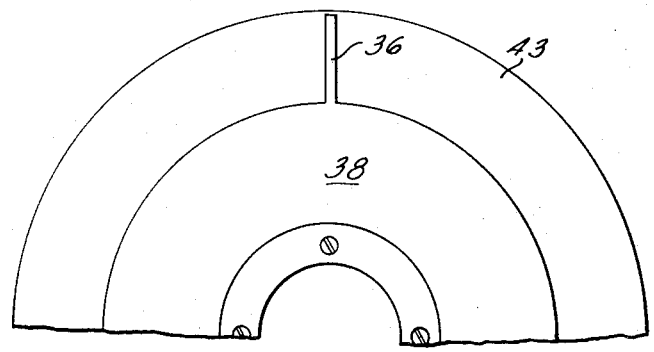

The power transistor switches PSA1, PSA2, PSB1, PSB2, PSC1 and PSC2 for power windings A1P, A2P, B1P, B2P, C1P and C2P respectively, are shown in block form in FIG. 1 and are identical to power transistor switch PSC2 for power winding C2P shown in detail in FIG. 9 comprising a plurality of paralleled power transistors Q1-Q8. The number of paralleled transistors Q1-Q8 is determined by the required current rating, and the series of dots in FIG. 9 indicates that any desired number of power transistors may be utilized in the transistor power swtich PSC2. The collectors of transistors Q1-Q8 are commoned and connected to stator power winding C2P. The emitters of paralleled transistors Q8 A8 are commoned and connected to the negative terminal —B of the battery. The bases of transistors Q1-Q8 are connected through similar resistors (only R1, R3 and R15 being shown) to the negative terminals —B of the battery and are also connected through similar resistors (only R2, R4 and R16 being shown) to a base lead DR to the interface circuit IFC2 for power switch PSC2. The base resistors R1-R16 insure base current sharing by the power transistors Q1-Q8. A diode D1 connected across emitter and collector of power transistors Q1-Q8 in opposite polarity thereto functions as a free-wheeling diode and regenerative path during the time the motor is acting as a generator to conduct currents flowing in the direction opposite to the current supplied by power switch PSC2 to stator winding C2P, such as may be generated during braking of the motor. A diode D2 coupled to a TRANS SUPP lead clamps the collectors of the power transistors Q1-Q8 to a common transient suppressor circuit (not shown) which is shared by all six power switches PSA1-PSC2.

INTERFACE CIRCUIT

The interface circuits IFA1, IFA2, IFB1, IFB2, IFC1 and IFC2 which drive the power switches PSA1, PSA2, PSB1, PSB2, PSC1 and PSC2 respectively are shown in block form in FIG. 1 and are similar to interface circuit IFC2 (see FIG. 9) which drives power switch PSC2. The principal function of the interface circuits IFA1-IFC2 is to step up the power level efficiently between the "logic" output from delay gating circuit 22 and the bases of the power switches PSA1-PSA2, and the interface circuits IFA1-IFC2 also protect the power switches by interrupting the "logic" signal from delay gating circuit 22 when abnormal voltages are sensed across the power switches. The base drive lead DR from power switch PSC2 is coupled to the emitter of a base drive transistor Q9 having its collector coupled through a diode 3 to drive winding C2D (which is inductively coupled to power winding C2P). The base of transistor Q9 is connected through a resistor R18 to the negative terminal —B of the battery and also to the emitter of a transistor Q10 having its collector coupled through a resistor R19 to the positive battery terminal. The collector of transistor Q9 is also coupled through a diode D4 and over a lead D0 to a drive oscillator shown in block form in FIG. 1. The base of transistor Q10 is coupled to a VCL lead from a variable current limit circuit 21 shown in block form in FIG. 1 and is also coupled through a resistor R21 to the collector of a transistor Q11. The emitter of transistor Q11 is connected to a positive five volt direct voltage regulator source +5V, and the base of PNP transistor Q11 is connected through a resistor R22 to a lead C2 from delay gating circuit 22. Interface circuit IFC2 is arranged so that a logical 0 voltage signal over lead C2 from the delay gating circuit 22 will result in turning on transistors Q11, Q10 and Q9 with the result of turning power switch PSC2 on (and so that a logic 1 signal on lead C2 will result in turning power switch PSC2 off).

When a power switch such as PSC2 is conducting, base current is fed back from the associated inductively linked power and drive windings C2P and C2D to sustain conduction of the power switch PSC2, and the magnitude of such feedback base drive current is a function of the drive winding voltage, the base-emitter voltage of the transistor power switch, and other voltage drops in the circuit. If the collector current of a power transistor switch becomes high enough to pull the power transistor swtich out of saturation, switch the base current drive to the power transistor switch will decrease and degenerative turn-off of the power transistor switch will occur. In other words, the increase of collector current to the power transistor switch pulls in into the active region and consequently increases its collector-to-emitter voltage, thereby decreasing the input to the power winding and also decreasing the output voltage from the corresponding drive winding and the base current drive to the power transistor. Such degenerative current limiting increases until the base drive transistor Q9 for the transistor power switch turns off and prevents the power switch from assuming a stable operating point in the active region where it would eventually be destroyed because of the generation of excessive heat.

Each phase A, B and C of the motor has two identical circuits, one for each power switch, and the conducting periods of the two power switches per phase (e.g., PSC1 and PSC2 for phase C) are displaced 180° so that a square wave is produced across rhe corresponding motor stator power windings such as C1P-C2P for full conduction. The other two phases A and B produce similar square waves with 120° displacement between phases for the three-phase output.

Logic 0 voltage and logic 1 voltage square wave signals over leads A1, A2, B1, B2, C1, and C2 from delay gating circuit 22 to interface circuits IFA1, IFA2, IFB1, IFB2, IFC1 and IFC2 respectively control the allowable "window" during which the power switches PSA1, PSA2, PSB1, PSB2, PSC1 and PSC2 may conduct. The initiation (and reinstatement) of power switch conduction is dependent upon pulses generated by drive oscillator 20. Drive oscillator 20 is triggered by a pulse over lead 78 from variable delay circuit 15 so that initiation of conduction by the power switches PSA1-PSA2 will coincide with the leading edges of the "logic" waveforms over leads A1, A2, B1, B2, C1 and C2 from delay gating circuit 22. Drive oscillator 20 generates a train of periodic pulses to reinstate conduction by the power switches after turn-off by current limiting.

The forward bias for power switch PSC2 is generated by drive winding C2D and is coupled through diode D3 of interface circuit IFC2 and the collector-emitter circuit of transistor Q9 to the base of power switch PSC2, while the reverse bias for the power switch PSC2 is also generated across drive winding C2D and is coupled to the base of power switch PSC2 through diode D6 in series with a resistance R23. The initial pulse from drive oscillator 20 over lead D0 is coupled through diode D4 and the collector-emitter circuit of base drive transistor Q9 of interface circuit IFC2 to the base drive lead DR and the bases of power transistors Q1-Q8 of power switch PSC2 to turn them on. As explained above, the initial pulse from drive oscillator 20 is coincident with a "logic" signal from delay gating circuit 22, and the negative-going logic 0 square wave pulse over lead C2 from delay gating circuit 22 is coupled to the base of PNP transistor Q11 to turn it on. The change of voltage on the collector of transistor Q11 turns on transistor Q10 and base drive transistor Q9. Transistors Q11 and Q10 raise the power level of the square wave negative-going "logic" pulses from delay gating circuit 22 and apply them to the base of base drive transistor Q9. Regeneration occurs through inductively coupled power and drive windings C2P and C2D, diode D3 and the collector-emitter circuit of base drive transistor Q9 to maintain power transistors Q1-Q8 in saturation, and power switch PSC2 remains conducting after the trigger pulse from drive oscillator 20 disappears. The power switch PSC2 will remain conducting until the coupled positive feedback can no longer support switch PSC2 in saturation. The train of periodic pulses (not shown) from drive oscillator 20 will continue for the duration of the square wave "logic" pulses c2 (see FIG. 3d) over lead C2 from delay gating circuit 22, and if power switch PSC2 should current limit and turn off during the conduction interval, conduction will be resumed at the next pulse from drive oscillator 20 which is coupled through diode D4 and transistor Q9 to the base of power transistors Q1-Q8.

Once the logic 0 square wave c2 over lead C2 from delay gating network 22 disappears and logic 1 reappears on lead C2 and the pulses from drive oscillator 20 cease, the regenerative feedback through windings C2P and C2D can no longer support the power switch PSC2 in saturation because transistor Q9 is not conducting. The collector-to-emitter voltage of transistors Q1-Q8 of power switch PSC2 consequently increase and thereby decrease the voltage input to power winding C2P. Resistor R23 in series with diode D6 of interface circuit IFC2 provides a path for turn-off current to power switch PSC2 in shunt to transistor Q9, and when power switch PSC2 turns off, the polarity of drive winding C2D reverses and provides reverse bias through diode D6 and resistance R23 to the bases of the power transistors Q1-Q8 of power switch PSC2.

GENERAL THEORY OF SPEED AND DIRECTION CONTROL

The two power switches in each phase, such as power switches PSA1 and PSA2 of phase A, conduct 180° apart to provide unidirectional current to the two oppositely polarized power windings A1P and A2P respectively of phase A to thus establish an alternating flux in each phase of the motor. Capacitive position sensor 11 determines the instantaneous motor rotor position and provides a three-phase square wave output A, $\bar{A}$, B, $\bar{B}$, C and $\bar{C}$ shown in FIG. 3a at a frequency proportional to motor speed and which is indicative of rotor position and thus of the position of the rotor field with respect to the stator phase windings. The three-phase position sensor output establishes the correct stator field sequence with respect to the rotor so that the six power switches PSA1-PSC2 conduct at the right time and in the right sequence to maintain the desired direction and rotational velocity of the stator rotating field which will keep the rotor field locked therewith. Control of the motor is accomplished by delaying the turning on of the power switches PSA1-PSC2 so that they are on for less than their full conduction period.

If the three-phase square wave output A, $\bar{A}$, B, $\bar{B}$, C and $\bar{C}$ of position sensor 11 (shown in FIG. 3a), which is synchronized to the rotor position, were applied without delay and directly over leads A1, A2, B1, B2, C1 and C2 from delay circuit 22 to interface circuits IFA1, IFA2, IFB1, IFB2, IFC1 and IFC2 respectively, the motor rotor R would rotate in the forward direction at full conduction of power switches PSA1-PSC2 and with the conduction window of the power switches PSA1-PSC2 in phase with the counter e.m.f. generated in the stator power windings by the magnetic flux of the resultant ampere turns (i.e., the resultant of the rotor field winding ampere turns and the armature reaction ampere turns). Motor speed and torque are selectively controlled by varying the duty cycle of the power switches PSA1-PSC2, i.e., the portion of the conduction window during which the power switches conduct. As the duty cycle of the power switches is increased, the average current carried by the power windings is increased and consequently motor torque and rotor speed are likewise increased.

Figure 3A:
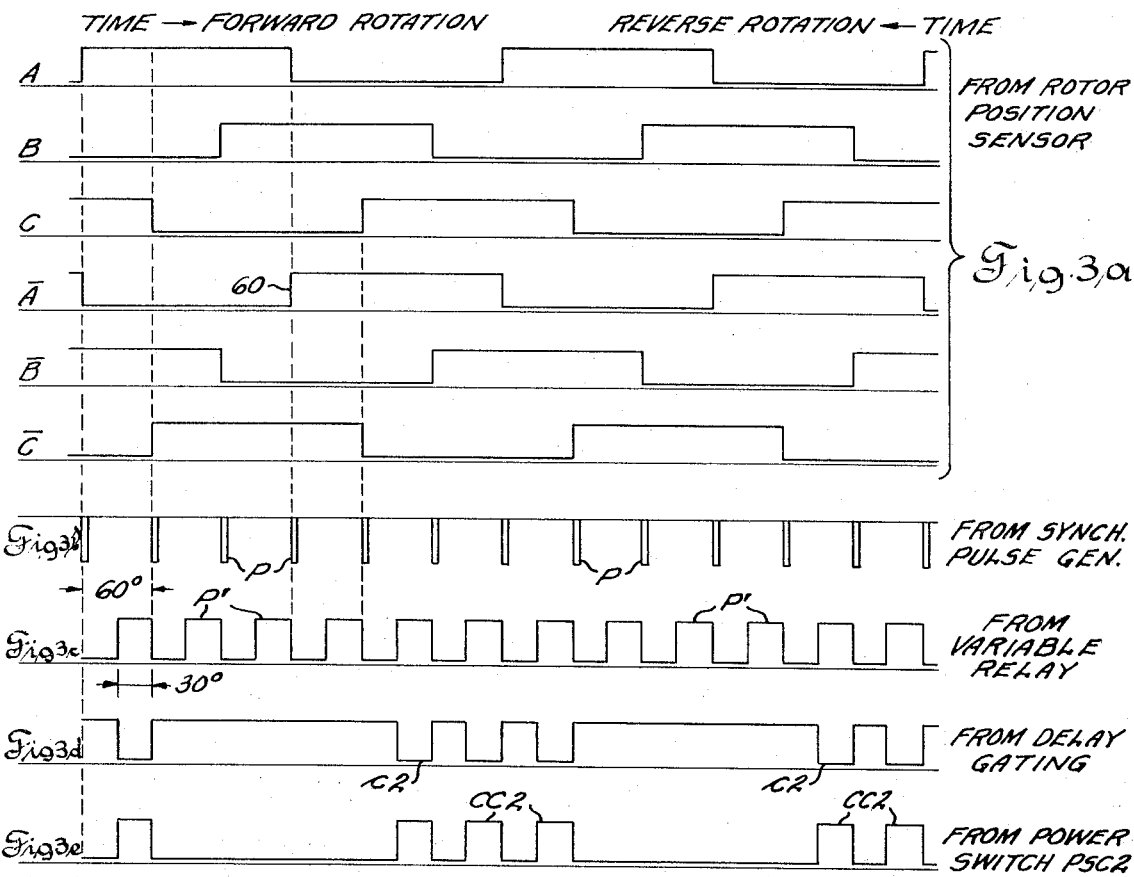
FIGS. 3a illustrates the three-phase output square waves from the square wave generator which indicate rotor position.

The rotor position sensor output square waves A, $\bar{A}$, B, $\bar{B}$, C and $\bar{C}$ shown in FIG. 3a are inputs to the angle-direction circuit 19 and determine the allowable window during which the power switches PSA1-PSA2 may conduct. The point of the beginning of conduction within the conduction window by the power switches PSA1–PSA2 is determined by the setting of a power control potentiometer PCP which is an input over lead 74 to variable delay circuit 15. Synchronous pulse generator 14 derives a train of timing pulses P shown in FIG. 3b at a frequency proportional to motor speed, and variable delay circuit 15 delays the pulses through a phase angle proportional to the setting of power control potentiometer PCP to derive delay pulses P' shown in FIG. 3c which initiate conduction by power switch PSC2. The train of drive pulses over lead D0 are coupled through diode D4 and transistor Q9 of interface circuit IFC2 to the bases of power transistors Q1–Q8 of power switch PSC2.

Each delay pulse P' (shown in FIG. 3c) from variable delay circuit 15 (and thus the train of drive pulses from drive oscillator 20) is continuous until the next synchronizing pulse P from pulse generator 14 is applied to variable delay circuit 15. Thus the power control potentiometer PCP sets the delay which can vary the conduction of the power switches PSA1–PSC2 from full-on to full-off.

The synchronous pulse generator 14 produces a timing pulse P (shown in FIG. 3b) at every square wave edge of the three-phase square wave output of rotor position sensor 11. For each of these timing pulses P, the delay circuit 14 regulated by the power control potentiometer PCP begins a delay period. There are three delay periods for each half cycle (180° electrical) of the rotor position square wave because a timing pulse P is generated at each square wave edge of the three-phase square wave. The control range of this delay period is from zero to one-third of a half cycle, i.e., 60° electrical, and such delay period controls the opening of gates NAND47 – NAND52 (FIG. 6) in the delay gating circuit 22 so that the output of delay gating circuit 22 over lead C2 to interface circuit IFC2 is three square wave segments c2 per half cycle (See FIG. 3d) each of which can be modulated from 0° to 60° of the half cycle. Assuming 30° delay, the resulting three current pulses CC2 from power switch PSC2 per half cycle are shown in FIG. 3e.

In a conventional synchronous motor the torque angle between the voltage applied to the stator windings and the counter e.m.f. generated by the flux of the resultant ampere turns varies from zero degrees at stall to almost 90° at a higher motor speed. The phase relation (torque angle) of the conduction by the power switches PSA1–PSC2 with respect to the counter e.m.f. generated in the stator power windings A1P–C2P (by the ampere turns which produce the air-gap flux) determines whether the motor is operating as a generator or a motor and also determines at what power level the motor is operating.

At low motor speeds and small displacement (torque) angles between counter e.m.f. and power switch conduction, such as occur at a stall condition, the stator winding looks like substantially pure resistance to the low frequency square waves produced by the power switches, while at higher speeds the synchronous reactance increases and the stator winding appears more like pure inductance to the battery. Consequently, it is desirable that the torque angle (i.e., the phase angle between the initiation of power switch conduction window and the counter e.m.f. generated in the stator windings by the resultant ampere turns) be small at low speeds so the stator field will be in step with the rotor and also that the torque angle be leading at higher motor speeds (with consequent higher synchronous reactance and lagging stator currents) so that the rotor field stays in synchronism with the rotating stator field.

The aforementioned U.S. Pat. No. 3,584,276 to W. L. Ringland et al discloses a variable speed synchronous motor drive system in which the displacement angle of the terminal voltage applied to the stator winding relative to the magnetic poles generated in the rotor is continuously varied as a function of motor speed to maintain the output power of the motor constant over the speed range.

In the preferred embodiment, the torque angle is limited to two discrete values, namely 0° and 60°. Such variation in phase angle at which power switch conduction is initiated can be either for forward or reverse rotation of the motor and is in addition to the variable delay in initiation of power switch conduction as a function of the setting of power potentiometer PCP provided by variable delay circuit 15. A torque angle of 0° is used only at very low speeds and is necessary to maintain stall torque. A 60° leading torque angle is a slight compromise since it is used over a wide speed range in which torque angles of other than 60° would yeild greater horsepower output from the motor, but it is a desirable compromise since the power output with 60° torque angle at maximum motor speed is approximately 85 percent of that obtained with the optimum 90° torque angle.

The speed direction circuit 16 provides signals to angle-direction circuit 19 which determine the direction of rotation of the motor (as manually selected by the direction switch DS) and also determine the proper torque angle of 0° or 60° as a function of motor speed. The phase angle selection information is derived from the speed switch 17 which determines whether the motor is turning faster or slower than a predetermined initial speed at which the motor power output for a torque angle of 60° is equal to that for a 0° torque angle. This equalization is necessary for a smooth transition upon changing the torque angle. The preferred embodiment is for a wound rotor synchronous motor, but the invention is also applicable to a variable speed brushless synchronous motor wherein magnetic poles are induced in a ferromagnetic rotor carrying no windings by a field winding on the motor stator.

CAPACITIVE POSITION SENSOR

The capacitive rotor position sensor 11 is disclosed in the copending application of Frederick A. Stich, Ser. No. 253,418, filed May 15, 1972, now U.S. Pat. No. 3,760,382 entitles Capacitive Position Sensor and having the same assignee as this invention, and establishes the correct sequence of enabling of the power switches PSA1–PSC2 with respect to the motor rotor. Another way of stating this function is that capacitive rotor position sensor 11 establishes the correct stator field sequence with respect to the rotor field. Capacitive rotor position sensor 11, in combination with square wave generator 12, derives a three-phase train of square waves A, $\bar{A}$, B, $\bar{B}$, C, and $\bar{C}$ at a frequency proportional to rotor angular velocity shown in FIG. 3a which is synchronized to the rotor position. If the output pulses from capacitive position sensor 11 were connected directly to the interface circuits IFA1–IFC2 to enable the power switches, the motor would rotate in the forward direction at full conduction and with the power switch conduction window in phase with the counter e.m.f. generated in the stator power windings A1P–C2P by the ampere turns which are the resultant of the rotor field ampere turns and the armature reaction ampere turns.

Capacitive position sensor 11 may have 2pn equals twelve stationary metallic capacitor plates, or electrodes 31 (See FIGS. 1, 2, 11 and 12) disposed side-by-side and forming an annular disk (where $n$ is the number of phases and $p$ is the number of rotor pole pairs) mounted on the motor stator. A rotatable capacitor plate shown in FIGS. 1 and 2 as comprising two electrically commoned, elongated and narrow metallic electrodes 36 aligned along a diameter of the circular disk 15 is operatively connected to the motor rotor R for movement therewith and is mounted for rotation adjacent the stationary capacitor plates 31.

Figure 2:
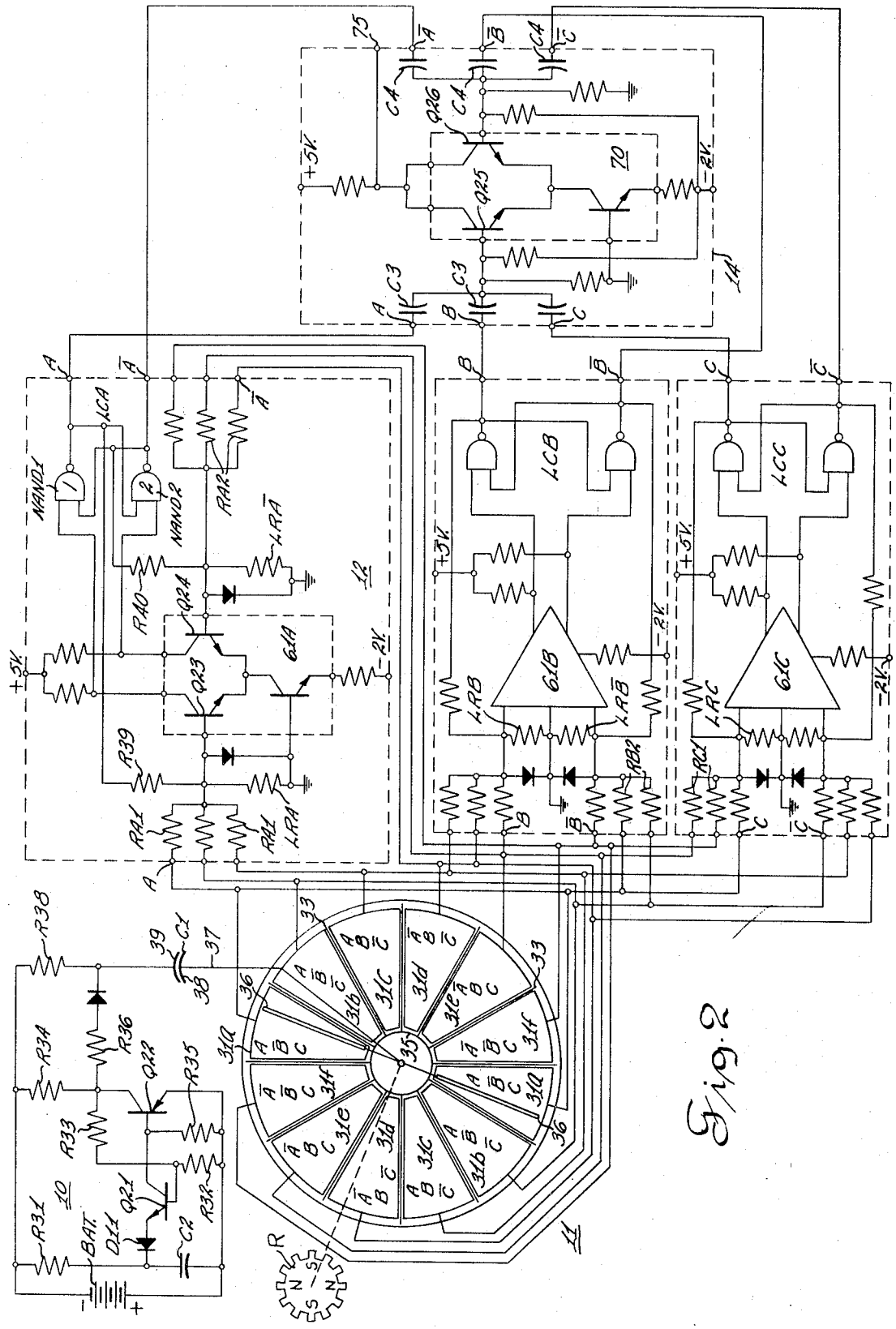
FIG. 2 is a schematic wiring diagram of the rotor position sensor, the square wave generator, and the synchronous pulse generator of the control of FIG. 1.

The rotatable position sensor electrodes 36 are schematically shown in FIG. 2 as electrically connected to each other and by a conductor 37 to a movable electrode 38 of a coupling capacitor C1 having a stationary electrode 39 coupled to the output of a position sensor relaxation oscillator 10 which is capable of producing fast time-rise pulses. As disclosed in the aforementioned U.S. Pat. No. 3,760,392 and shown in FIGS. 11 and 12, the stationary metallic position sensor electrodes 31 may be copper plates in the shape of a sector of a ring affixed by suitable means to a stationary annular stator board 40 mounted by fastening means 41 to the end bell 42 of the motor stator. The stationary electrode of coupling capacitor C1 may be a thin annular copper ring 39 affixed to stationary stator board 40 radially inward from electrodes 31. The movable electrode of coupling capacitor C1 may be a thin annular copper member 38 affixed to a rotating annular rotor board 43 fastened to the motor rotor R. Movable electrode 38 of the coupling capacitor C1 may have thin diametrically opposed fingers 36 integral therewith extending radially outward which constitute the rotatable plates 36 of the capacitive position sensor 11.

The high frequency pulses generated by relaxation oscillator 10 are coupled through rotatable capacitor electrodes 36 to the adjacent stationary plates 31 and the load connected thereto. Oscillator 10 provides "read-out" pulses to the rotatable capacitor plates 36, and these read-out pulses are distributed to the fixed capacitor plates 31. The high frequency components of the read-out pulses readily couple through adjacent movable and fixed plates 36 and 31 into the load connected to the fixed plates 31. Inasmuch as the preferred embodiment has a four-pole rotor, diametrically opposite plates 31 are displaced 360 electrical degrees and are electrically connected together. The outputs from the fixed plates 31 of capacitive rotor position sensor 11 are converted by square wave generator 12 into the set of three-phase square waves A, $\overline{A}$, B, $\overline{B}$, C and $\overline{C}$ shown in FIG. 3a which are at a frequency proportional to motor speed and are indicative of the position of the rotor field relative to the stator phase windings.

SQUARE WAVE GENERATOR

Square wave generator 12 inclues three identical differential amplifiers 61A, 61B, and 61C (See FIG. 2) which are associated with the phases A, B and C respectively and produce the output for said phase. Square wave generator 12 converts the read-out pulses received on the rotor position sensor stationary plates 31a, 31b, 31c, 31d, 31e and 31f into the set of three-phase square waves A, B and C and their complements $\overline{A}$, $\overline{B}$ and $\overline{C}$ shown in FIG. 3a having a frequency which is a function of the rotational velocity of the motor rotor. The motor rotor has four poles, and consequently each pair of diametrically opposed position sensor plates 31 (which are displaced 360 electrical degrees) are electrically connected together. Each pair of diametrically opposed, electrically commoned position sensor stationary plates 31 is connected to one of the inputs to each of the three differential amplifiers 61A, 61B and 61C as shown in FIG. 2. For example, electrically commoned position sensor stationary plates 31a designated A, $\overline{B}$, C are connected through a resistor RA1 to an A input of differential amplifier 61A, through a resistor RB2 to a $\overline{B}$ input of differential amplifier 61B, and through a resistor RC1 to a C input of differential amplifier 61C. The designations A resistors, $\overline{B}$ resistors, C resistors, etc., connotes that the particular input resistor is connected to a pair of diametrically opposed stationary electrodes 31 bearing this designation in FIG. 2 and which results in the corresponding output pulse being at logic 1 voltage when movable electrodes 36 are opposite these stationary plates. Resistors RA1 are connected to the pairs of stationary electrodes 31a, 31b and 31c each of which is designated A and which together subtend 180° electrical and result in the generation of the A pulse during the interval that rotating electrodes 36 have closer capacitive coupling to these stationary capacitor plates than to the stationary electrodes 31d, 31e and 31f designated $\overline{A}$. Similarly, RB2 input resistors are connected to the pairs of stationary capacitor electrodes 31f, 31a and 31b all of which are designated $\overline{B}$ and which together subtend 180 electrical degrees and result in the generation of the $\overline{B}$ square wave during the 180° electrical interval when rotatable electrodes 36 are opposite thereto. The corresponding inputs to the phase differential amplifiers 61A, 61B and 61C are coupled to stationary plates displaced 120 electrical degrees so that the output pulses A, B and C have 120° electrical phase displacement, e.g., stationary plates 31a, 31b, 31c designated A coupled to load impedance LRA are displaced 60° (120° electrical) from plates 31c, 31d and 31e designated B coupled to load impedance LRB.

Square wave generator 12 also includes three NAND gate latch circuits LCA, LCB and LCC each of which is associated with one of the phases and the differential amplifier for that phase. For example, differential amplifier 61A and latch circuit LCA are associated with phase A and together generate the square wave pulse A for phase A shown in FIG. 3a and its negation $\overline{A}$ (which is the inverse of A).

The three differential amplifiers 61A, 61B and 61C are identical and only the differential amplifier 61A for phase A will be described. Differential amplifier 61A is of conventional configuration, and the base of one transistor Q23 is coupled to the three resistors RA1 which add the signals from the pairs of position sensor stationary plates 31a, 31b, and 31c respectively. The base of the other transistor Q24 of differential amplifier 61A is coupled to the three $\overline{A}$ input resistors RA2 which are individually connected to the pairs of position sensor stationary plates 31d, 31e and 31f and sum the signals therefrom.

Differential amplifier 61A provides a low voltage or logic 0 output on the collector of that transistor Q23 or Q24 having its base coupled to the three pairs of position sensor stationary plates 31a, 31b, 31c or 31d, 31e, 31f having the greatest coupling to the rotatable electrodes 36, thereby giving an indication of the position of the motor rotor R. For example, if rotatable plates 36 are in a position where the sum of the read-out pulses received on the pairs of plates 31a, 31b, and 31c, designated A, is greater than the sum of the pulses received on pairs of stationary plates 31d, 31e, and 31f, designated $\bar{A}$, transistor Q23 will be turned on and the voltage on its collector will be low and transistor Q24 will be turned off and its collector potential will be relatively high.

Differential amplifiers 61A, 61B, and 61C enhance the "one-to-zero" ratio of the inputs from capacitive position sensor 11 and control NAND gate latch circuits LCA, LCB, and LCC respectively which convert the enhanced pulses into the square waves A, $\bar{A}$, B, $\bar{B}$, C and $\bar{C}$.

SYNCHRONOUS PULSE GENERATOR

Synchronous pulse generator 14 receives the three-phase rotor position square waves A, B, and C and their complements $\bar{A}$, $\bar{B}$, and $\bar{C}$ from square wave generator 12 and generates a timing pulse P shown in FIG. 3b at every square wave edge of the output from square wave generator 12. Synchronous pulse generator 14 thus forms a pulse train wherein each timing pulse P corresponds to a change of state in position sensor 11. Inasmuch as there are six edges per cycle of the three-phase square waves A, $\bar{A}$, B, $\bar{B}$, C and $\bar{C}$, six timing pulses P are derived by synchronous pulse generator 14 at a frequency proportional to motor speed for each cycle of the three-phase square wave output from square wave generator 12.

Synchronous pulse generator 14 shown in FIG. 2 includes a single-ended differential amplifier 70 of conventional design wherein the base of one transistor Q25 is coupled to the A, B and C leads from the latch circuits LCA, LCB, and LCC of the square wave generator 12 through individual differentiating capacitors C3. The base of the other transistor Q26 of differential amplifier 70 is coupled to the $\bar{A}$, $\bar{B}$, and $\bar{C}$ leads from square wave generator 12 through individual differentiating capacitors C4. The collectors of transistors Q25 and Q26 are commoned and connected to the output lead 75 in which the train of synchronizing pulses P shown in FIG. 3b appears. The input capacitors C3 and C4 differentiate the square wave output A, B, C, $\bar{A}$, $\bar{B}$ and $\bar{C}$ from square wave generator 12, and the differential amplifier 70 is operated in an overdriven mode and shapes the pulses to form a single train of negative going timing pulses P at the commoned collectors, as shown in FIG. 3b at a frequency indicative of motor speed and with a pulse generated at each change of state of the NAND gate latch circuits LCA, LCB, and LCC of the square wave generator 12, i.e., at every square wave edge of the output pulses A, $\bar{A}$, B, $\bar{B}$, C and $\bar{C}$ from the position sensor 11 and the square wave generator 12.

VARIABLE DELAY CIRCUIT

If the three phase rotor position output A, B, C, $\bar{A}$, $\bar{B}$, $\bar{C}$ of square wave generator 12 directly controlled the power switches PSA1–PSC2, the motor would rotate in the forward direction at full conduction and with the conduction window of the power switches in phase with the voltage generated by the rotor position sensor 11. Control of motor speed and torque is accomplished by "phasing back," or delaying the power switches from their full conduction. Stated in another way, speed and torque of the motor are selectively controlled by varying the duty cycle of the power switches PSA1–PSC2, i.e., the portion of the conduction window during which the power switches conduct. It will be appreciated that as the duty cycle of the power switches is increased, the average current carried by the stator windings A1P, A2P, B1P, B2P, C1P and C2P, the torque on the rotor, and the speed of the rotor R are correspondingly increased.

The initiation (and reinstatement) of conduction by power switches PSA1–PSC2 is determined by pulses from drive oscillator 20. Timing pulses P (See FIG. 3b) from synchronous pulse generator 14 appearing in conductor 75 are delayed in a variable delay circuit 15 through a phase angle which is a function of the setting of power control potentiometer PCP to form the train of delay pulses P' shown in FIG. 3c which trigger drive oscillator 20 and enable gates NAND47 – NAND52 of the delay gating circuit 22 (See FIG. 6).

In the preferred embodiment the timing pulse P from synchronous pulse generator 14 shown in FIG. 3b are 60° apart, the variable delay circuit 15 generates three delay pulses P' per half cycle which are illustrated in FIG. 3c as having been delayed 30° relative to the timing pulses P from synchronous pulse generator 14, and the power switch PSC2 conducts three current pulses CC2 of 30° duration in each half cycle as illustrated in FIG. 3e. Inasmuch as there are three current pulses CC2 per half cycle, if each delay pulse P' is delayed by 0° to 60°, the net duty cycle of the power switches PSA-1–PSC2 will vary from 0° to 180°.

Figure 4:
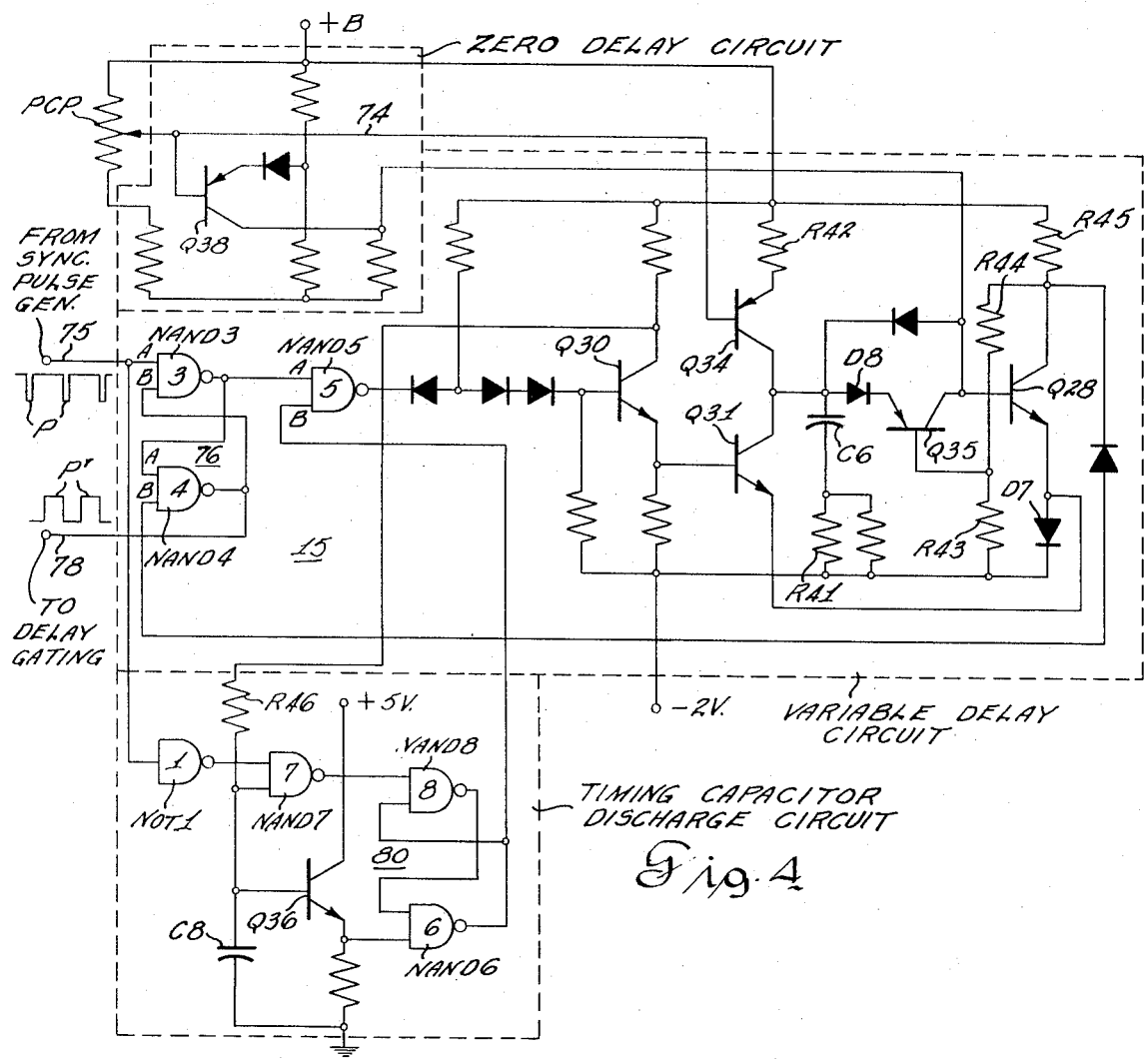
FIG. 4 is a schematic wiring diagram of the variable delay circuit.

Variable delay circuit 15 is shown in FIG. 4 and includes an input latch circuit 76 comprising NAND gates NAND3 and NAND 4. Input latch circuit 76 is "set" to form the trailing edge of a delay pulse P' (shown in FIG. 3c) each time a negative-going timing pulse P from synchronous pulse generator 14 on lead 75 is applied to the A input of gate NAND3. Input latch circuit 76 is "reset" after a time delay to form the leading edge of a positive going delay pulse P' (shown in FIG. 3c) each time a transistor Q28 conducts and changes its collector voltage from high to low to provide logic 0 on the B input to gate NAND4. The delay pulses P' generated at the output of gate NAND4 appear on output lead 78 which is connected to drive oscillator 20 and to delay gating circuit 22.

In the interim between timing pulses P from synchronous pulse generator 14, circuit 76 is "latched" with logic 1 on the A input and logic 1 on the B input (pulse P') of gate NAND3 so that logic 0 appears on its output at the leading edge of each delay pulse P'. The logic 0 output of gate NAND3 when input latch circuit 76 is reset is connected to the A input of a NAND gate NAND5 which has logic 1 on its B input from a NAND gate NAND6, thereby providing logic 1 output from gate NAND5 which maintains two transistors Q30 and Q31 conducting and prevents charge of a time delay capacitor C6. The series arrangement of the collector-emitter circuit of conducting transistor Q31 and a diode D7 is in shunt to the series arrangement of timing capacitor C6 and a resistor R41 and maintains timing capacitor C6 discharged when the input latch circuit 76 is reset. In the reset condition of input latch circuit 76, the logic 0 output from gate NAND3 is applied to the A input of gate NAND4 to keep logic 1 on the output of gate NAND4 and on conductor 78 and thus maintain delay pulse P' positive.

A negative-going timing pulse P from synchronous pulse generator 14 over lead 75 applies logic 0 to the A input of gate NAND3 to set latch circuit 76 and thus provides logic 1 on the output of gate NAND3. The logic 1 output from gate NAND3 is coupled to the A input of gate NAND4 and changes its output to logic 0 which forms the trailing edge of the positive-going delay pulse P' when input latch circuit 76 is set. The logic 0 output from gate NAND4 is coupled to the B input to gate NAND3 to maintain the input circuit 76 latched in set condition with logic 1 on the output from gate NAND3 even after input pulse P disappears and logic 1 again appears on lead 75 and the A input of gate NAND3.

The logic 1 on the output of gate NAND3 is applied to the A input to a gate NAND5 when input latch circuit 76 is set. The logic 1 from gate NAND3 and logic 1 from gate NAND6 applied to the A and B inputs of gate NAND5 provides logic 0 output from gate NAND5 which turns off transistor Q30. The turning of transistor Q30 off lowers the forward bias on the base of NPN transistor Q31 and turns it off. Turning transistor Q31 off permits time delay capacitor C6 to begin to charge from the positive terminal of the battery through a resistor R42 in series with the emitter-collector circuit of a transistor Q34 which constitutes a variable current generator for the charging of time delay capacitor C6. The slider of power control potentiometer PCP is coupled over lead 74 to the base of current generator transistor Q34, and the setting of power control potentiometer PCP determines the forward bias on the base of transistor Q34 and the charging current flowing to time delay capacitor C6, thereby determining the phase angle by which the delay pulses P' from variable delay circuit 15 are delayed relative to timing pulses P from synchronous pulse generator 14.

One electrode of time delay capacitor C6 is coupled through a diode D8 to the emitter of a transistor Q35 having its base coupled to the junction of two resistors R43 and R44 which, in series with a resistor R45, form a voltage divider connected across the batteryterminals and determine the emitter potential at which transistor Q35 will begin to conduct. When the charge on time delay capacitor C6 reaches a predetermined potential, transistor Q35 is turned on, and the change of its collector potential is coupled to the base of transistor Q28 and turns it on. Conduction by transistor Q28 lowers its collector potential from logic 1 voltage to logic 0 voltage which is coupled to the B input to gate NAND4 to reset the input latch circuit 76 and provide logic 1 on the output of gate NAND4. The logic 1 on the output of gate NAND4 and on conductor 78 is the leading edge of the delay pulse P' from variable delay circuit 15. The logic 1 from gate NAND4 is also coupled to the B input to gate NAND3, thereby providing logic 0 output from gate NAND3 to reset the input latch circuit 76, and also provide logic 1 from gate NAND5 to turn on transistors Q30 and Q31 and discharge time delay capacitor C6.

Inasmuch as synchronous pulse generator 14 derives a timing pulse P at each edge of the three-phase square wave output from square wave generator 12, three delay pulses P' will be provided by the variable delay cricuit 15 during each 180° conduction window, and FIG. 3e illustrates current pulses CC2 conducted by power switch PSC2 resulting from 30° phase shift of the delay pulses P' from variable delay circuit 15.

ZERO DELAY SWITCH

The minimum delay that can be provided by variable delay circuit 15 is approximately 15 microseconds, but this is too long to permit the motor to deliver maximum output horsepower. A zero delay PNP transistor switch Q38 (FIG. 4) has its base coupled to the slider of power control potentiometer PCP and its collector connected to the base of NPN transistor Q28. When the slider of power control potentiometer PCP approaches its maximum setting, the base of zero delay transistor switch Q38 becomes forward biased and it conducts. The change of potential at the collector of transistors Q38 when it is turned on is applied to the base of transistor Q28 and turns it on, thereby reducing the collector potential of transistor Q28 and the B input of gate NAND4 to logic 0 and maintaining logic 1 on the output lead 78 from variable delay circuit 15 to assure that the delay pulses P' to drive oscillator 20 and delay gating circuit 22 are continous and that the power switches PSA1–PSC2 conduct continously until the end of the 60° conduction period.

As discussed hereinbefore, the torque angle, or displacement angle, between the voltage applied to the stator winding and the counter e.m.f. generated by the air gap flux should ideally be varied from zero at stall to ninety degrees at a higher speed, but in the preferred embodiment the torque angle is limited to two discrete values, namely 0° and 60° by varying the phase angle between the initiation of the power switch conduction window and the rotor position as a function of motor speed. Stated another way, different angularly displaced rotor position signals selectively control the conduction windows of the power switches in order to change torque angle as a function of motor speed. This is in addition to the variation of the point of initiation of conduction within the conduction window for the purpose of regulating motor speed and torque.

The speed-direction circuit 16 provides output signals on leads $\overline{S}'F$, $\overline{S}'\overline{F}$, $S'F$ and $S'\overline{F}$ which determine the direction of rotation of the motor, as manually selected by the direction switch DS, and also determine the proper torque angle of 0° or 60° as a function of motor speed. The torque angle information is derived from the speed switch 17 which determines whether the motor is turning faster or slower than a predetermined initial speed at which the motor power output for a torque angle of 60° is equal to that for a 0° torque angle.

SPEED SWITCH

Figure 5:
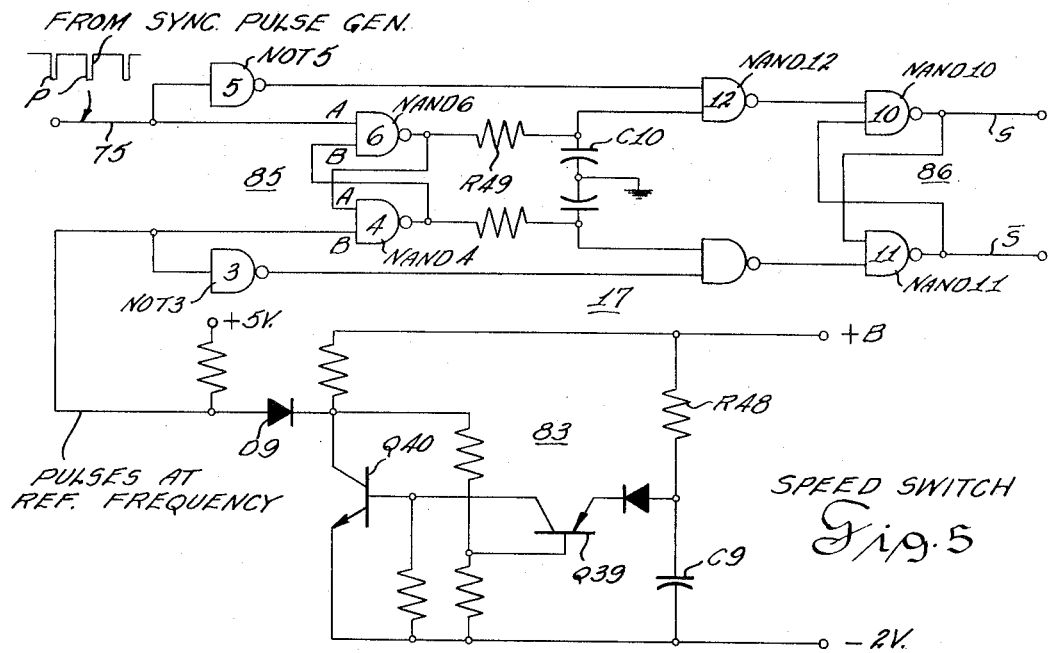
FIG. 5 is a schematic wiring diagram of the speed switch.

Speed switch 17 shown in FIG. 5 detects when motor speed is equal to the predetermined critical speed at which the torque angle is changed between 0° and 60°. The critical motor speed is set by a relaxation oscillator 83 which generates a train of pulses at a reference frequency and includes a timing capacitor C9 which is charged from the battery through a resistance R48 to a predetermined voltage which forward biases the emitter of a PNP transistor Q39 and turns it on to discharge the timing capacitor C9 and turn on a transistor Q40.

Conduction by transistor Q40 lowers its collector voltage and generates a negative-going, logic 0 pulse which is coupled through a diode D9 to the input of a NOT gate inverting amplifier NOT3 and also to the B input of a NAND gate NAND4 of an input latch circuit 85.

The input to speed switch 17 is the train of negative-going timing pulses P over conductor 75 from the synchronous pulse generator 14 which are applied to the A input of a NAND gate NAND6 of input latch circuit 85 and also to the input of a NOT gate NOT5. The input latch circuit 85 is set by each logic 0 timing pulse P from the synchronous pulse generator 14 to provide logic 1 from gate NAND6, and is reset by a pulse from reference oscillator 83 to provide logic 0 from gate NAND6 and logic 1 from gate NAND4.

The speed switch 17 also includes an output latch circuit 86 comprising NAND gates NAND10 and NAND11 which is set (and also reset) by two successive pulses from the same pulse train without an intervening pulse from the other pulse train. The output from gate NAND6 is coupled through an integrator circuit of resistor R49 and capacitor C10 to the B input of a NAND gate NAND12 having its A input coupled to the output of gate NOT5 and its output coupled to the A input of NAND gate NAND10 of the output latch circuit 86. A negative-going timing pulse P from the synchronous pulse generator 14 will change the outputs of gates NOT5 and NAND6 to logic 1, and if the next pulse is also on lead 75 from the synchronous pulse generator 14, the output of gate NAND6 will still be logic 1 (since the input latch 85 has not been reset by a pulse from the reference oscillator 83 applied to gate NAND4), and gate NAND12 will provide logic 0 on its output to the A input of gate NAND10, thereby setting the output of gate NAND10 and the output lead S to logic 1, which indicates that the timing pulses P are coming in faster from the synchronous pulse generator 14 than pulses from the reference oscillator 83 and that the motor rotor is above the critical speed.

In a similar manner the output of gate NAND11 on the $\bar{S}$ lead to speed-direction circuit 16 is set to logic 1 when the pulses from the reference oscillator 83 occur faster than the timing pulses P from the synchronous pulse generator 14.

The speed-direction circuit 16 receives logic 1 on the S lead from speed switch 15 when the motor speed is above the critical speed and a 60° torque angle is desired. Speed-direction circuit 16 receives logic 1 on the F lead when the direction switch DS is operated to provide forward motor rotation and receives logic 1 on the $\bar{F}$ lead when direction switch DS is operated to reverse the direction of rotation of the motor.

DIRECTION SWITCH

FIG. 1 schematically illustrates that a plus five volt (logic 1) source is connected through resistors R50 and R51 respectively to the F and $\bar{F}$ leads and that direction switch DS has normally closed contacts 90 that clamp the $\bar{F}$ lead to ground when the switch is in the forward position and are opened to provide plus 5 volts (or logic 1) on the $\bar{F}$ lead when the switch DS is operated to the reverse position. Direction switch DS also has normally open contacts 91 which permit the F lead to be at logic 1 potential when the switch DS is in the forward position and are closed to clamp the F lead to ground (and logic 0) when the switch DS is operated to the reverse position.

SPEED-DIRECTION CIRCUIT

The speed-direction circuit 16 (See FIG. 6) includes a memory flip-flop latch 93 having a pair of three-input NAND gates NAND14 and NAND15 which lock the latch 93 in the condition existing when the signal on the S lead from the speed switch 15 goes from logic 0 to logic 1, i.e., when the motor exceeds the critical speed. Below the critical motor speed, logic 1 exists on the $\bar{S}$ lead and logic 0 exists on the S lead and the memory latch 93 will respond to the signals on the F and $\bar{F}$ leads from the direction switch DS to vary the logic signals on the $\bar{S}'F$, $\bar{S}'\bar{F}$, $S'F$ and $S'\bar{F}$ leads to angle-direction circuit 19 and thus change torque angle and motor direction. Thus, if the direction switch DS is reversed, the signals on leads F and $\bar{F}$ reverse to change the direction of motor rotation, and the state of memory latch 93 can change as long as the signal on lead $\bar{S}$ is 1 and the signal on lead S is logic 0. As the motor speed rises above the critical value, the signal on lead S becomes logic 1 and that on lead $\bar{S}$ becomes logic 0, locking the memory latch 93 and recording the status of direction switch DS at that time. As long as motor speed remains above the critical speed, a change in the direction switch DS will not change the state of the memory latch 93 and thus will not change the direction of motor rotation.

The S lead from speed switch 17 is coupled to the C input of gate NAND14 and also to the A input of gate NAND15. The $\bar{S}$ lead is coupled to the B input of a NAND gate NAND16 and the A input of a NAND gate NAND17. The $\bar{F}$ lead from direction switch DS is coupled to: (a) the A input of gate NAND16; (b) the B input of a NAND gate NAND21; (c) to the A input of gate NAND14; and (d) the B input to a NAND gate 23. The F lead from direction switch DS is coupled to: (a) the B input of gate NAND17; (b) the C input of gate NAND15; (c) the A input of a NAND gate NAND20; and (d) the A input of a NAND gate NAND22. The output of gate NAND16 is coupled to the A input of a NAND gate NAND18 having its output coupled to the B input of gate NAND14, and the output of gate NAND17 is coupled to the B input of a NAND gate NAND19 having its output coupled to the B input of gate NAND15 of the memory latch 93.

Below Critical Speed

Assume that logic 1 appears on the F and $\bar{S}$ leads indicating respectively forward motor rotation and motor speed below the critical speed. Under these conditions, the outputs of gates NAND14 and NAND15 will both be logic 1 because each has logic 0 on the S lead as an input. The logic 1 outputs of gates NAND14 and NAND15 are coupled to the A and B inputs of a NAND gate NAND24 which provides logic 0 on its output which is connected to the S' lead. The logic 0 output of gate NAND24 is coupled to the input of a NOT gate NOT7 whose output is logic 1 and is connected to the $\bar{S}'$ lead. The S' lead is coupled to the A and B inputs of gates NAND23 and NAND22 respectively, and the $\bar{S}'$ lead is coupled to the A and B inputs of NAND gates NAND21 and NAND20 respectively.

Still assuming logic 1 on the $\bar{S}$ and F leads, (which provide logic 1 on the $\bar{S}'$ lead as described above), the output of gate NAND20 will be logic 0 since it has logic 1 on both its inputs. The logic 0 output of gate NAND20 is converted to logic 1 by a NOT gate NOT8 to provide logic 1 on the $\bar{S}'F$ lead to the angle-direction circuit 19, thereby indicating forward rotation of the motor and that 0° torque angle is desired. Under such assumed conditions, the output of gates NAND21, NAND22 and NAND23 will be logic 1 because each has one logic 0 input, and NOT gates NOT9, NOT10, and NOT11 convert such logic 1 to logic 0 on the $\overline{S}'F$, $S'F$, and $S'\overline{F}$ output leads from the speed-direction circuit 16 to the angle-direction gating network 19. The output of the gates may be represented:

| | GATE | OUTPUT |
|---|---|---|
| $\overline{S}=1$ | NAND 14 | 1 |
| $S=0$ | NAND 15 | 1 |
| $F=1$ | NAND 16 | 1 |
| $\overline{F}=0$ | NAND 17 | 0 |
| | NAND 18 | 0 |
| | NAND 19 | 1 |
| | NAND 20 | 0 |
| | NAND 21 | 1 |
| | NAND 22 | 1 |
| | NAND 23 | 1 |
| | NAND 24 | 0 |

Logic 0 on the output of gate NAND 18 and logic 1 on the output of gate NAND 19 is the condition set in memory latch 93 when the direction switch DS is in the forward position.

If direction switch DS is now operated to the reverse position, logic 1 appears on the $\overline{F}$ lead and logic 0 on the F lead. The output of gate NAND16 changes to logic 0, the output of gate NAND17 changes to logic 1, the output of gate NAND18 changes to logic 1, and the output of gate NAND 19 changes to 0. Gates NAND14 and NAND15 do not change states since each has a logic 0 input from the S lead. The output of gate NAND20 becomes logic 1 and the output of gate NAND21 changes to logic 0 which is converted by gate NOT 9 to logic 1 on the $\overline{S}'\overline{F}$ lead,

| | GATE | OUTPUT |
|---|---|---|
| $\overline{S}=1$ | NAND 14 | 1 |
| $\overline{F}=1$ | NAND 15 | 1 |
| $F=0$ | NAND 16 | 0 |
| $S=0$ | NAND 17 | 1 |
| | NAND 18 | 1 |
| | NAND 19 | 0 |
| | NAND 20 | 1 |
| | NAND 21 | 0 |
| | NAND 22 | 1 |
| | NAND 23 | 1 |
| | NAND 24 | 0 |

It will thus be noted that the memory latch 93 changes when the motor is below the critical speed and the direction switch DS is thrown to the reverse position. Logic 1 on the output of gate NAND18 and logic 0 on the output of gate NAND19 is the condition set in memory latch 93 when the direction switch is in the reverse direction.

Above Critical Speed

If the motor speed rises above the critical speed when the direction switch DS is in the forward position, logic 1 appears on the S lead from speed switch 15 and logic 0 on the $\overline{S}$ lead. The logic 0 on the $\overline{S}$ lead changes the output of gate NAND17 to logic 1, but gate NAND16 does not change its logic 1 output. The output of gate NAND18 remains logic 0 and that of gate NAND19 logic 1, which is the condition set in memory latch 93 when direction swtich DS is forward. The logic 1 on the S lead changes the output of gate NAND15 to logic 0 since it has logic 1 on all three inputs, but does not change the logic 1 output of gate NAND14, thereby providing logic 1 output from gate NAND24 on the $S'$ lead and logic 0 output from gate NOT7 on the $\overline{S}'$ lead. The output of gate NAND23 remains at logic 1, but the output of gate NAND22 goes to logic 0 which is converted to logic 1 on the output of gate NOT10 and the $S'F$ lead, thereby indicating that rotation of the motor above the critical speed in the forward direction with a 60° torque angle is desired.

The three-input NAND gates NAND14 and NAND15 compare the status of memory latch 93 with the status of direction lever DS when the motor is above the critical speed. If the memory latch 93 and direction switch DS both agree, either both forward or both reverse, then the 60° torque angle is allowed, as indicated by $S'$ equals logic 1. In the immediately preceding paragraph the condition set in the memory latch 93 was forward, i.e., logic 0 on gate NAND18 and logic 1 on gate NAND19, and agreed with the forward position of direction lever DS, thereby allowing the 60° torque angle indicated by $S'$ equals logic 1.

If, however, the latch 93 and direction lever DS disagree, as would occur if the vehicle were going forward above the critical speed and the operator changed the direction switch DS to call for reversal of the motor, then the torque angle is changed to 0° to provide braking action even though the speed switch 17 provides logic 1 on the S lead. This is necessary because at high speeds motor operation with a 120° torque angle can be similar to that at a 60° torque angle, and changing the direction switch DS from forward to reverse displaces the phase angle by 180°, thereby converting the 60° torque angle to 120°. Consequently, if the operator reversed the direction switch DS to reverse vehicle direction when the motor was above the critical speed, the vehicle would not respond with braking and subsequent reversing action if $S'$ remained logic 1, but rather would continue to drive in the forward direction and might even go faster. The speed-direction circuit 16 corrects this by changing the torque angle from 60° to 0° when the direction switch DS is reversed and motor speed is above the critical speed.

Reversal of the direction switch DS under such high speed conditions provides logic 0 on the F lead and logic 1 on the $\overline{F}$ lead, the output of gate NAND16 remains logic 1 and the output of gate NAND17 remains logic 1 so memory latch 93 does not change states. The output of gate NAND14 remains logic 1 since it has logic 0 on its B input from gate NAND18, but the output of gate NAND15 becomes logic 1 when lead F becomes logic 0. The logic 1 output from both gates NAND14 and NAND15 provide logic 0 output from gate NAND24 on the $S'$ lead and logic 1 on the output of gate NOT7 and the $\overline{S}'$ lead. The logic 1 on the $\overline{S}'$ and $\overline{F}$ leads provides logic 0 output from gate NAND21 which is converted to logic 1 on the $\overline{S}'\overline{F}$ lead to call 0° torque angle and for braking of the motor.

The logic 1 output of gate NAND15 when the motor is rotating forward above the critical speed and direction switch DS is reversed is thus a braking signal which provides logic 1 on the $\overline{S}'\overline{F}$ lead (or on the $\overline{S}'F$ lead of the motor is rotating in the reverse direction) and results in braking of the motor. In alternative embodiments different means such as a manually operated braking lever derive a braking signal, and the speed-direction circuit is responsive to such braking signal to change torque angle into a different quadrant to accomplish braking of the motor.

If the operator should change his mind and return direction switch DS to the forward position, the memory latch 93 would not change states, but the output of gate NAND14 would become logic 0, and the output of gate NAND24 on the S' lead would become logic 1, thereby providing logic 0 on the output of gate NAND22 and logic 1 on the S'F lead. This ability to change the torque angle above the critical speed can be utilized by the vehicle drive to obtain flexibility in operation of the vehicle.

In a similar manner the operator can change the torque angle from 60° to 0° to brake the vehicle when the motor is operating in the reverse direction above the critical speed by actuating the direction switch DS to the forward position.

Angle-direction Circuit

Figure 6:
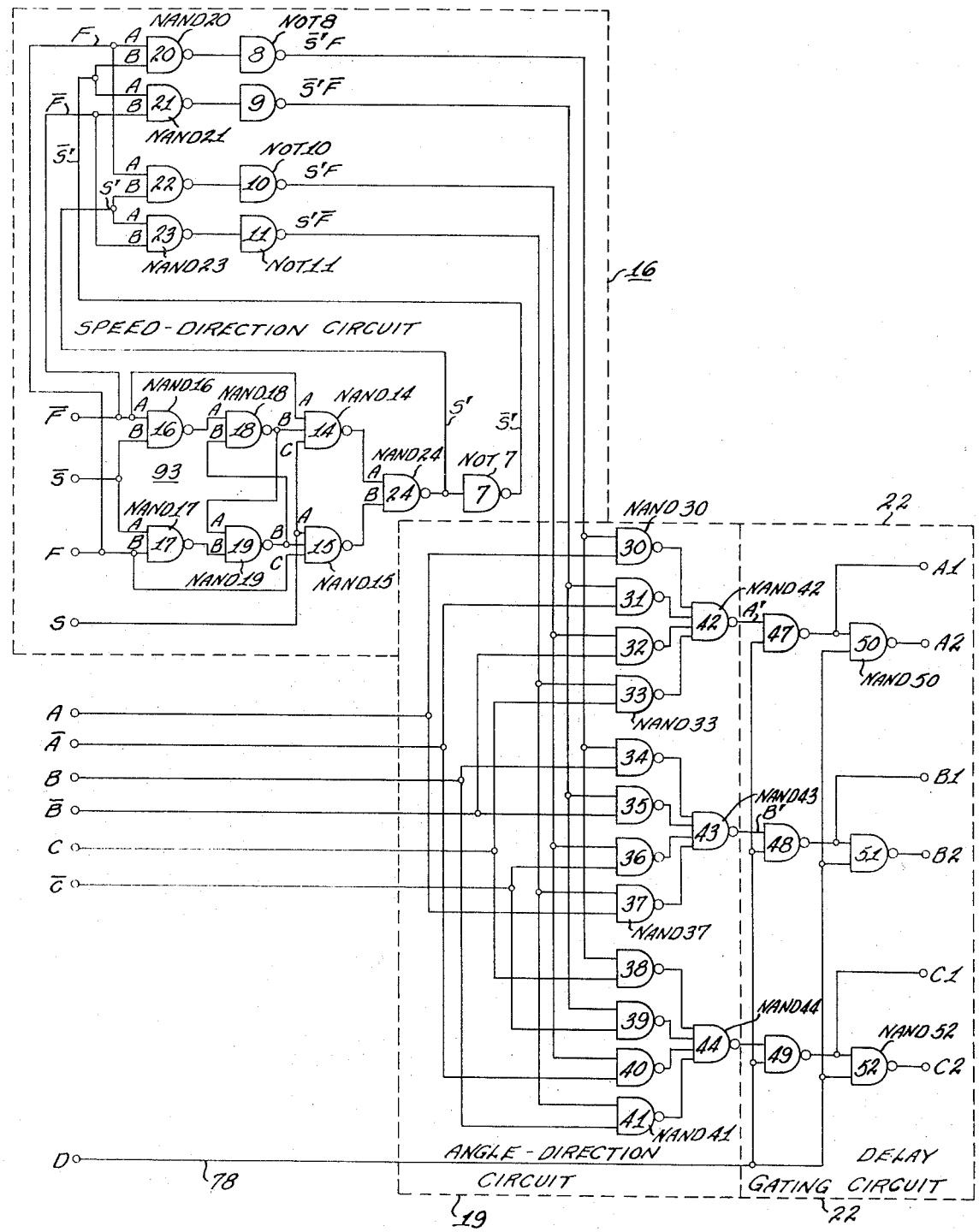
FIG. 6 is a schematic wiring diagram of the speed-direction circuit, the angle-direction gating circuit, and the delay gating circuit.

Angle-direction gating circuit 19 shown in FIG. 6 selects one of four different signal patterns for the output voltage phase displacement with respect to the rotor position in accordance with the information on the S'$\overline{F}$, $\overline{S'F}$, S'F and $\overline{S'}$F leads from the speed-direction circuit 16. The rotor position signals A, $\overline{A}$, B, $\overline{B}$, C and $\overline{C}$ are utilized to determine the conduction windows for the power switches PSA1–PSC2 and thus control the phase angle of output voltage relative to rotor position, and one of four possible rotor position signals from the group A, $\overline{A}$, B, $\overline{B}$, C or $\overline{C}$ is coupled (after delay) to the interface circuits for the pair of power switches associated with each phase of the motor in accordance with the information on the $\overline{S'}$F, $\overline{S'F}$, S'F, and S'$\overline{F}$ leads to provide: (a) 0° torque angle, forward rotation; (b) 0° torque angle, reverse rotation; (c) 60° torque angle, forward rotation; or (d) 60° torque angle, reverse rotation.

Angle-direction gating circuit 19 includes twelve NAND gates NAND30 through NAND41 each of which has an A input connected to one of the $\overline{S'}$F, $\overline{S'F}$, S'F, or S'$\overline{F}$ leads from the speed-direction circuit 16 and a B input connected to one of the A, $\overline{A}$, B, $\overline{B}$, C or $\overline{C}$ leads from square wave generator 12. Four gates NAND 30–33 are associated with phase A of the motor and power switches PSA1 and PSA2; four gates NAND 34–37 are associated with phase B of the motor and power switches PSB1 and PSB2; and four gates NAND 38–41 are associated with phase C of the motor and power switches PSC1 and PSC2. The outputs of the four gates NAND 30–33 associated with phase A are inputs to a four-input NAND gate NAND42. The outputs of the four gates NAND 34–37 associated with phase B of the motor are inputs to a four-input NAND gate NAND43, and the outputs of the four gates NAND 38–41 associated with phase C of the motor are inputs to four-input NAND gate NAND44.

Forward Rotation Below Critical Speed

The output of gate NAND42 designated A' is logic 1 whenever any one of the four gates NAND 30–33 is enabled, or opened so that its output is logic 0, and thus the A' output of gate NAND42 can be any one of the four rotor position signal inputs A, $\overline{A}$, $\overline{B}$, or C to the gates NAND30, NAND 31, NAND32 or NAND33 respectively. The A' output of gate NAND42 is the rotor position signal A when logic 1 appears on the $\overline{S'}$F lead calling for forward rotation of the motor at 0° torque angle, and the logic 1 output A' is converted by NAND gate 47 of delay gating circuit 22 to logic 0 input over lead A1 to interface circuit IFA1 and results (assuming no time delay) in conduction by power switch PSA1 for the duration of the A rotor position signal as represented by the current pulses CA1 from power switch PSA1 shown in FIG. 7a. The B' and C' outputs of gates NAND43 and NAND44 are the rotor position signals B and C respectively when logic 1 exists on the $\overline{S'}$F lead, (forward rotation below critical speed) and under these conditions (assuming no time delay), the outputs of gates NAND48 and NAND49 of delay gating circuit 22 are logic 0 on the B1 and C1 leads to interface circuits IFB1 and IFC1 respectively and power switches PSB1 and PSC1 will conduct for the duration of the rotor position sensor output waves B and C respectively.

Reverse Rotation Below Critical Speed

Figure 7:
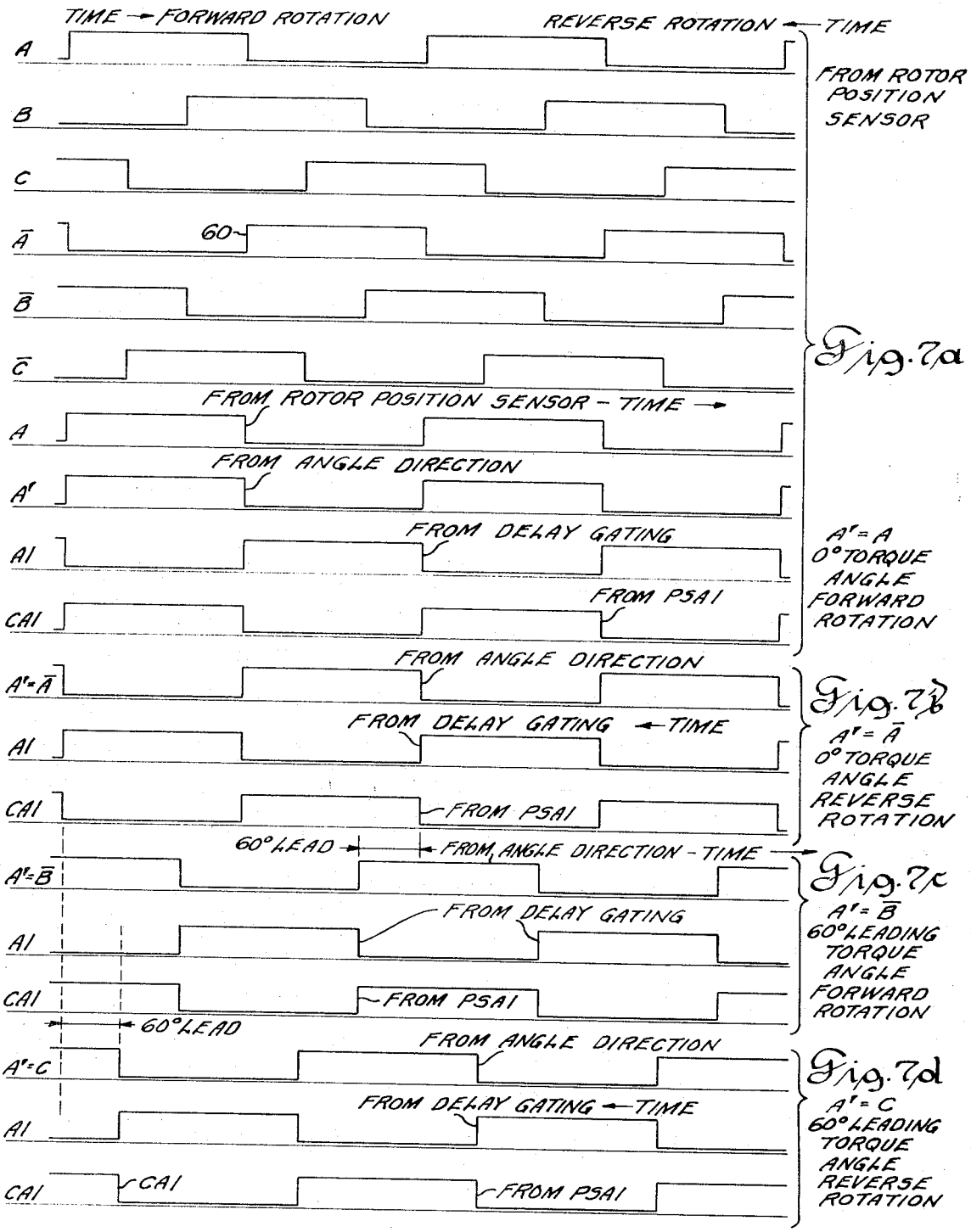
FIGS. 7a, 7b, 7c and 7d show the rotor position signals which enable power switches PSA1 and PSA2 for, respectively: (a) forward motor rotation and 0° torque angle; (b) reverse rotation and 0° torque angle, (c) forward rotation and 60° leading torque angle, and (d) reverse rotation and 60° leading torque angle.

The A' output of gate NAND42 is the rotor position signal $\overline{A}$ when logic 1 appears on the $\overline{S'F}$ lead from speed-direction circuit 16 (calling for reverse direction of the motor below critical speed at 0° torque angle) and the A' = $\overline{A}$ output from gate NAND42 is converted by gates NAND47 and NAND50 of delay gating circuit 22 to logic 0 input over lead A1 to interface circuit IFA1 and logic 1 input over lead A2 to interface circuit IFA2 and results (assuming no time delay) in conduction by power switch PSA1 and turning off of power switch PSA2 and for the duration of the $\overline{A}$ rotor position signal as represented by current pulses CA1 from power switch PS1A shown in FIG. 7b. The B' and C' outputs of gates NAND43 and NAND44 will similarly be rotor position signals $\overline{B}$ and $\overline{C}$ when logic 1 exists on the $\overline{S'F'}$ lead calling for reverse rotation at 0° torque angle, and the gates NAND48 and NAND49 of delay gating circuit 22 will convert these signals to logic 0 on leads B1 and C1 respectively, and the gates NAND51 and NAND52 will provide logic 1 on leads B2 and C2 respectively so that power switches PSB1 and PSC1 respectively are enabled to conduct and power switches PSB2 and PSC2 respectively turn off (assuming no delay) for the duration of the rotor position signals $\overline{B}$ and $\overline{C}$. This results in the stator rotating magnetic field being shifted 180 electrical degrees relative to the rotor and causes rotor R to reverse its direction of rotation. Reversal of rotor direction causes rotor position sensor 11 to generate the rotor position signals in the sequence A, $\overline{B}$, C, $\overline{A}$, B, $\overline{C}$ with time plotted to the left as shown in FIG. 3 so that the power switches are enabled in the sequence PSA2, PSB1, PSC2, PSA1, PSB2 and PSC1 during the duration of rotor position signals A, $\overline{B}$, C, $\overline{A}$ B, $\overline{C}$ respectively when logic 1 appears on the $\overline{S'}$F lead.

Forward Rotation Above Critical Speed

The A' output of gate NAND42 is the rotor position sensor output wave $\overline{B}$ when logic 1 exists on the S'F lead from speed-direction circuit 16 (calling for forward rotation at 60° torque angle above the critical speed) and the output of gate NAND32 becomes logic 0 when $\overline{B}$ equals logic 1. The A' = $\overline{B}$ (logic 1) output from gate NAND42 is converted by gate NAND47 of delay gating circuit 22 to logic 0 input over lead A1 to interface circuit IFA1 and results (assuming no time delay) in conduction by the power switch PSA1 for the duration of the $\overline{B}$ position sensor output signal as represented by the current pulses CA1 from power switch PSA1 shown in FIG. 7c. It will be noted that rotor position signal $\overline{B}$ leads signal A by 60° so that conduction by power switch PSA1 is shifted 60° relative to the rotor R, and consequently the torque angle is 60° leading. The B' and C' outputs of gates NAND43 and NAND44 respectively will similarly be the rotor position signals $\overline{C}$ and $\overline{A}$ when logic 1 exists on the S'F lead calling for forward rotation above the critical speed, and (assuming no delay) the switches PSB1 and PSC1 will conduct for the duration of the $\overline{C}$ and $\overline{A}$ position signals. These signals are converted by gates NAND48 and NAND49 to logic 0 on the B1 and C1 leads and will also be converted by gates NAND51 and NAND52 to logic 0 on the B2 and C2 leads so that power switches PSB1 and PSC1 respectively will conduct (and power switches PSB2 and PSC2 respectively will be turned off) for the duration of the $\overline{C}$ and $\overline{A}$ rotor position signals. The power switches conduct in the sequence PSA2, PSB1, PSC2, PSA1, PSB2, PSC1 during (assuming no delay) the duration of the rotor position signals B, $\overline{C}$, A, $\overline{B}$, C, A respectively and accomplish 60° electrical leading phase shift of the conduction window for the power switches and forward rotation of the rotor R.

Reverse Rotation Above Critical Speed

The A' output of gate NAND42 is the rotor position signal C when logic 1 on the S'$\overline{F}$ lead (calling for reverse direction at 60° leading torque angle above the critical speed) and provides logic 0 output from gate NAND33 during the duration of the C signal. The resulting A' = C (logic 1) output from gate NAND42 is converted by gate NAND47 to logic 0 on the A1 lead and by gate NAND50 to logic 1 on the A2 lead and results (assuming no delay) in enabling power switch PSA1 to conduct and turning off power switch PSA2 for the duration of the C rotor position signal as represented by current pulses CA1 from power switch PSA1 shown in FIG. 7d. It will be noted that for reverse rotation the rotor position signal C leads signal $\overline{A}$ by 60° electrical (to the left in FIG. 3) to thus accomplish 60° leading phase shift of the current conduction by power switch PSA1 relative to the rotor position. The B' and C' outputs of gates NAND43 and NAND44 will be the rotor position signals A and B respectively when logic 1 exists on the S'$\overline{F}$ lead. Gates NAND48 and NAND49 will convert the B' = A and C' = B signals to logic 1 inputs over leads B1 and C1 to interface circuits IFB1 and IFC1 respectively, and gates NAND51 and NAND52 will convert the B' = A and C' = B rotor position signals to logic 0 outputs on leads B2 and C2 to interface circuits IFB2 and IFC2. Consequently, power switches PSB1 and PSC1 respectively will be turned off and PSB2 and PSC2 respectively will conduct during the duration of the A and B rotor position signals. The power switches will be enabled to conduct in the sequence PSC1, PSA1, PSB1, PSC2, PSA1, and PSB2 during the rotor position signals B, $\overline{C}$, A, $\overline{B}$, C, $\overline{A}$ to accomplish reverse 60° leading phase shift of the rotating magnetic field relative to rotor position and thus rotate rotor R in the reverse direction with 60° leading torque angle.

DELAY GATING CIRCUIT

Delay gating circuit 22 includes three NAND gates NAND47, NAND48 and NAND49 having a first input connected respectively to the A', B' and C' leads from the angle-direction circuit 19 and a second input connected to lead 78 from variable delay circuit 15 in which the delay pulses P' (See FIG. 3c) appear that are delayed as a function of the setting of power control potentiometer PCP. The outputs of gates NAND47, NAND48 and NAND49 are connected respectively to the A1, B1 and C1 leads to the interface circuits IFA1, IFB1 and IFC1 where they are amplified to trigger power switches PSA1, PSB1 and PSC1 into conduction. The outputs of gates NAND47, NAND48 and NAND49 are also coupled to first inputs of NAND gates NAND50, NAND51 and NAND52 respectively each of which has a second input connected to lead 78 in which the train of delay pulses P' appears and which have their outputs respectively coupled to the A2, B2, and C2 leads to the interface circuits IFA2, IFB2 and IFC2 for gating power switches PSA2, PSB2 and PSC2 respectively.

Gates NAND 47–52 are not opened or enabled until the logic 1 voltage of delay pulses P' (See FIG. 3c) is applied to their inputs, and consequently the rotor position square waves A, $\overline{A}$, B, $\overline{B}$, C and $\overline{C}$ which appear on the A', B' and C' leads are not applied to the interface circuits to trigger power switches PSA1–PSC2 into conduction until the delay pulses P' are applied to the inputs to NAND gates 47–52, thereby varying the conduction time by the power switches PSA1–PSC2 and consequently regulating motor torque and speed. The duration of the signals A1, A2, B1, B2, C1 and C2 from NAND gates 47–52 of delay gating circuit 22 is determined by the width of the P' delay pulses from variable delay circuit 15, and the conduction time of the power switches PSA1–PSC2 is a function of the time interval that NAND gates 47–52 are open. Inasmuch as three delay pulses P' occur during each half cycle (i.e., each 180 electrical degrees), each signal A1–C2 from gates NAND 47–52 can vary in width from 0° to 60°, and consequently power conduction by the power switches PSA1–PSC2 is regulated from zero conduction to full 180° power switch operation. NAND gates 47–49 generate the three wave segments per half cycle (such as CC2 shown in FIG. 3e) which control gating of power switches PSA1, PSB1 and pSC1, and NAND gates 50–52 generate the three complements of such wave segments which control gating of power switches PSA2, PSB2 and PSC2.

Assume that logic 1 exists on the $\overline{S}$'F lead calling for forward rotation below the critical speed and that the power control potentiometer PCP is adjusted to accomplish 30° delay of the pulses P' from variable delay circuit 15. The A' output of gate NAND42 becomes logic 1 at the leading edge of the A wave, but the outputs of gates NAND47 and NAND50 remain logic 1 because of logic 0 on lead 78 so that interface circuit IFA1 does not trigger power switch PSA1 into conduction until 30° later when the logic 1 delay pulse P' changes the output of gate NAND47 to logic 0 to turn on transistor Q11 of interface circuit IFA1 and thus trigger power switch PSA1 into conduction. The logic 0 output from gate NAND47 is coupled to one input of gate NAND50 and thus maintains its output at logic 1 which is applied to the A2 lead to interface circuit IFA2 so that power switch PSA2 does not conduct.

As another example, assume that logic 1 exists on the $\overline{S}$'$\overline{F}$ lead calling for reverse rotation below the critical speed and that the power control potentiometer PCP is adjusted to accomplish 30° delay of the pulses P' from variable delay circuit 15. The A' output of gate NAND42 becomes logic 1 when the position sensor output wave $\overline{A}$ becomes logic 1, and the outputs of gates NAND47 and NAND50 are logic 1 because of logic 0 on the delay pulse lead 78 until 30° later when the logic 1 delay pulse P' changes the output of gate NAND47 to logic 0 to thus turn on transistor Q11 of interface circuit IFA2 and trigger power switch PSA1 into conduction. The output of gate NAND50 remains logic 1 during the duration of the $\bar{A}$ signal because of the logic 1 output from gate NAND42 so that power switch PSA2 is not triggered into conduction.

FIELD CURRENT REGULATOR

Figure 13:
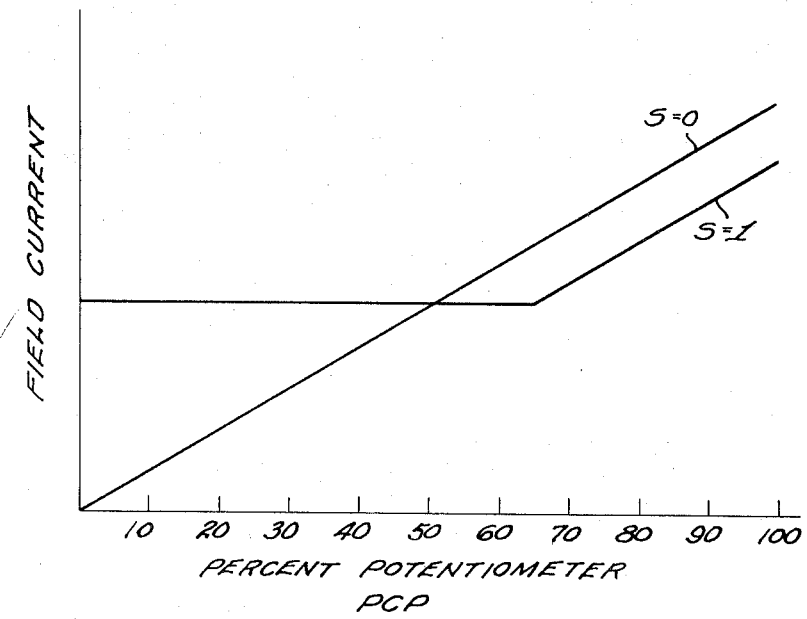
FIG. 13 shows the field current regulator characteristics.
Figure 8:
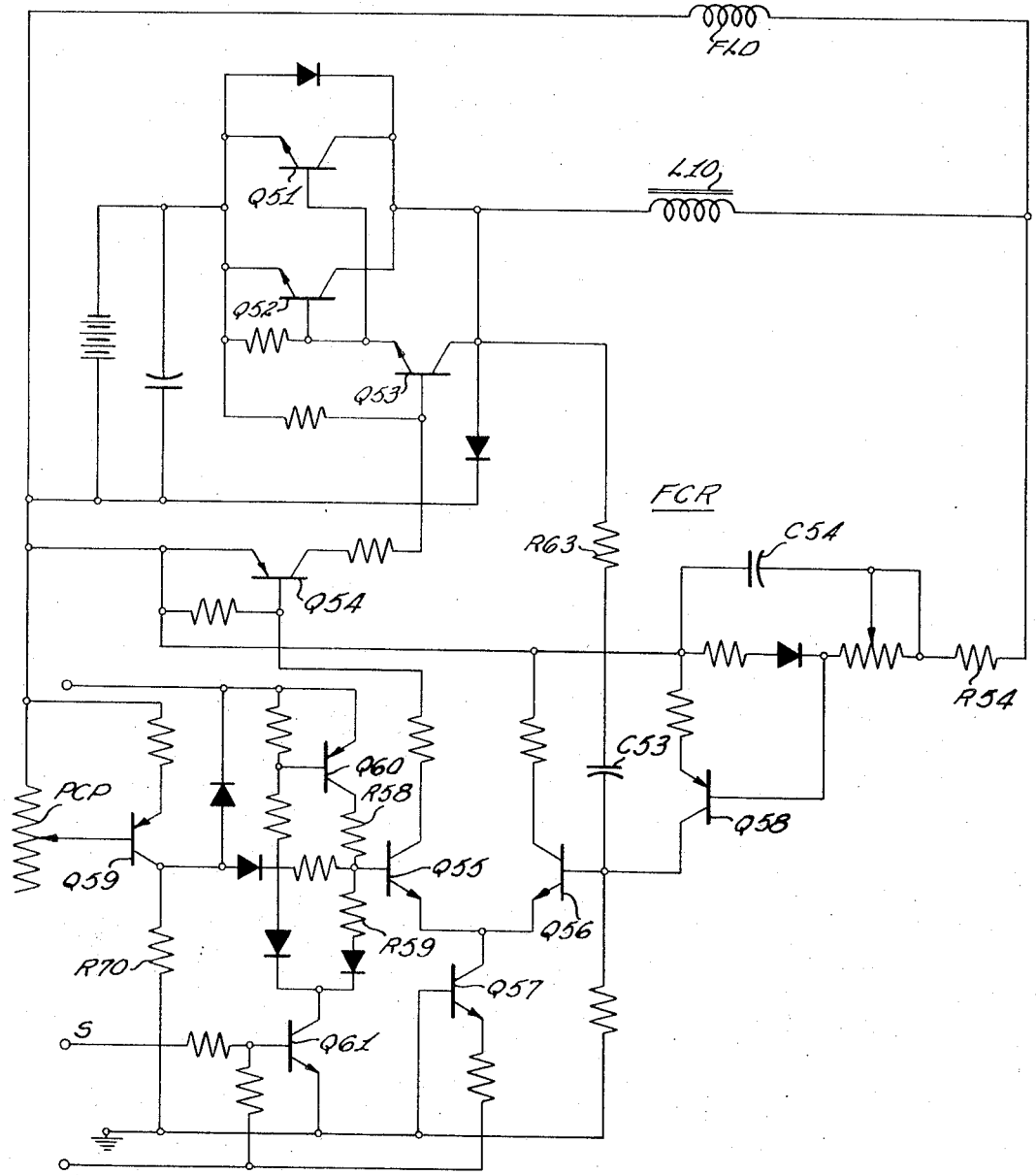
FIG. 8 is a schematic wiring diagram of the motor field current regulator.

Field current regulator FCR shown in FIG. 8 is responsive to the setting of power control potentiometer PCP and receives an input over the S lead from speed switch 17 and has a low speed characteristic $S = 0$ shown in FIG. 13 when the motor is below the critical speed and a high speed characteristic $S = 1$ when the motor is above the critical speed. Low speed curve $S = 0$ illustrates that: (1) no field current flows when the motor is idling; (2) field current increases linearly with the setting of power control potentiometer PCP (which simultaneously varies stator voltage) so that motor torque is varied smoothly at inching velocities of the vehicle, and (3) motor torque can be increased smoothly up to stall torque by adjusting potentiometer PCP. The flat portion of the high speed $S = 1$ characteristic illustrate that, when the motor is above the critical speed, field current is constant up to a predetermined setting of potentiometer PCP to provide the required excitation for both: (1) motoring, and (2) regenerating to accomplish electrical braking of the motor. Field current increases linearly above this setting.

Field winding FLD is in series with the battery, two paralleled power switches Q51 and Q52, and an inductor L10. Field current regulator FCR is basically a pulse ratio modulation, or bang-bang circuit, including a differential amplifier comprising transistors Q55, Q56 and Q57 which regulate field current by differentially comparing a variable reference signal applied to the base of transistor Q55 with a "current magnitude" signal, which is a measure of the field current, applied to the base of transistor Q56. The variable reference signal is a function of both the setting of power control potentiometer PCP and the speed signal S. The current magnitude signal is a function of the voltage drop generated by the field current flowing through the resistance of the field winding. The differential amplifier is single-ended and its output is derived at the collector of transistor Q55 and amplified by a transistor Q54 whose output controls a base drive transistor Q53 for paralleled power transistors Q51 and Q52.

The voltage drop generated by field current flowing through the resistance of field winding is integrated by a resistance R54 and a capacitor C54 to derive the current magnitude signal. The level of the current magnitude signal is translated by a transistor Q58 and applied to the base of transistor Q56.

If the speed signal S is logic 0, transistors Q60 and Q61 are biased off, and the reference signal applied to the base of transistor Q55 is essentially a function of the voltage drop across resistor R70 that is determined by the setting of potentiometer PCP which regulates the magnitude of collector current from transistor Q59. When the motor is above the critical speed, the speed signal S becomes logic 1 to turn on transistors Q60 and Q61. Conduction by transistors Q60 and Q61 switches fixed resistances R58 and R59 to the base of transistor Q55 to thus apply a minimum reference signal thereto and thereby generate the flat portion of the $S = 1$ high speed characteristic. At higher settings of power control potentiometer PCP, the minimum reference voltage is modified by the voltage drop across resistance R70 to derive the linearly upward sloping portion of the $S = 1$ characteristic. Positive feedback is provided from the collectors of power transistors Q51 and Q52 through resistance R63 and capacitor C53 to the base of transistor Q56 to establish a maximum frequency of operation and thereby limit power dissipation in the power transistors Q51 and Q52.

Although the preferred embodiment utilizes rotor position sensor output signals of 180° electrical duration, it will be appreciated that the rotor position sensor signals which control conduction of the power switches can be of any desired period. Further, although the preferred embodiment has been described as shifting the rotating stator field through a single (60°) torque angle as a function of motor speed, it will be apparent that in alternative embodiments the rotating m.m.f. can be shifted through a plurality of different torque angles corresponding to different rotor position sensor output signals and further that the rotating stator field can be shifted through angles of other than 60° electrical relative to the rotor position.

The preferred embodiment discloses a motor having center tapped wye-connected stator phase windings with the two halves of each stator phase winding oppositely polarized in a push-pull arrangement, but the invention is also applicable to a motor with an untapped stator winding for each phase and power switch means controlled by rotor position signals to reverse the direction of current flow through the stator phase windings to reverse the direction of motor rotation. Further, although the preferred embodiment has been described with power transistors and with a direct current source, it will be appreciated that the invention is also applicable to a variable speed synchronous motor control system wherein the stator phase windings are energized from an alternating current source through thyristors or a cycloconverter.

While only a single embodiment of the invention has been illustrated and described, it should be understood that we do not intend to be limited to the single embodiment for many modifications and variations thereof will be obvious to those skilled in the art.

The embodiments of the invention in which an exclusive property or privilege is claimed are defined as follows:

1. An electronic commutation system for an electric motor having a stator provided with n phase windings, where n is an integer greater than one, a rotor rotatable within said stator, and means for generating magnetic poles in said rotor comprising, in combination, an electrical power source,
   at least *n* controllable semiconductors arranged to conduct current from said power source to said stator phase windings in a predetermined sequence,
   rotor position sensor means for deriving time-displaced square wave rotor position signals at a frequency proportional to rotor angular velocity indicative of the position of said rotor within said stator,
   commutation switching means including n logic gate sets each of which sets is associated with one of said stator windings and includes a plurality of logic gates receiving rotor position signals and control signals as inputs for sequentially enabling said semiconductors so that said stator windings generate a rotating magnetic field in synchronism with said rotor poles, said logic gates being enabled when the control signal and rotor position signal inputs thereto occur simultaneously, the logic gates of each set receiving rotor position input signals displaced by predetermined angles, corresponding logic gates of said n sets receiving time-displaced rotor position signals that occur in a sequence which results in said stator windings generating a rotating magnetic field, means associated with each logic gate set and responsive to the enabling of any logic gate thereof for deriving an enabling signal for the associated semiconductor, and means for selectively coupling control signals simultaneously to the corresponding gates of said n sets, whereby the torque angle of said motor may be selectively varied.

2. In the combination of claim 1 and including means for selectively varying the power duty cycle of said semiconductors during said semiconductor enabling signals.

3. In the combination of claim 2 wherein said means for generating magnetic poles in said rotor includes a field winding, means for energizing said field winding, and adjustable means for selectively varying the energization of said field winding.

4. In the combination of claim 3 wherein said means for selectively varying power duty cycle includes an adjustable element, and said means for varying field winding energization is responsive to regulation of said adjustable element so that said adjustable element simultaneously controls both field winding current and power duty cycle.

5. In the combination of claim 2 wherein said power duty cycle varying means includes n delay gating means each of which has its input coupled to the associated means for deriving a semiconductor enabling signal and its output coupled to one of said semiconductors, and means for selectively adjusting the time interval that said n delay gating means are opened during said rotor position signals.

6. In the combination of claim 5 wherein said means for selectively adjusting the time interval that said delay gating means are open includes means for deriving a plurality of timing pulses during each of said rotor position signals, means for generating a delay pulse from each of said timing pulses after a predetermined time delay and being selectively adjustable to vary said time delay, and means for opening said n delay gating means during each of said delay pulses.

7. In the combination of claim 2 wherein said rotor position signal deriving means generates signals of 180 electrical degree duration and said power duty cycle varying means includes gating means between each logic gate set and the associated semiconductor for turning said semiconductor on a plurality of times during the 180 electrical degree duration of the semiconductor enabling signals, and means for selectively varying the time said semiconductors carry current each time they are turned on.

8. In the combination of claim 7 wherein said rotor position signal deriving means generates n rotor position signals and their complements, said gating means includes synchronous pulse deriving means for generating a timing pulse at the leading edge of each rotor position signal, and said means for selectively varying the time said semiconductors carry current includes means for turning on a semiconductor after a time delay each time a timing pulse occurs during the semiconductor enabling signal and variable time delay means for selectively varying the time delay interval between the occurrence of a timing pulse and initiation of current conduction by said semiconductor.

9. In the combination of claim 2 wherein said power duty cycle varying means includes means for turning each of said semiconductors on a plurality of times within the duration of the semiconductor enabling signal, and means for selectively varying the time said semiconductors carry current each time they are turned on.

10. In the combination of claim 2 and including $2n$ controllable semiconductors, and wherein said motor stator has n center-tapped phase windings with the halves of each phase winding connected in series with said source and one of said semiconductors so that the magnetic fluxes generated by said winding halves are in opposite directions.

11. In the combination of claim 10 wherein said rotor position signal deriving means generates n rotor position signals of 180 electrical degree duration displaced $360/n$ electrical degrees apart and also generates their complements, and wherein said semiconductor enabling signal generating means includes means for deriving signals which are complements of each other for enabling the semiconductors associated with the halves of each stator phase winding so that the winding halves operate in push-pull.

12. In the combination of claim 1 wherein each of said logic gate sets includes first and third logic gates, said first gates of said n sets receive first rotor position signals displaced $360/n$ electrical degrees apart and said third gates of said n sets receive third rotor position signals displaced $360/n$ electrical degrees apart that are also displaced by a predetermined phase angle from aid first rotor position signals to thereby permit selective variation of the torque angle of said motor.

13. In the combination of claim 12 and including means for deriving a speed signal when said motor attains a predetermined speed, and wherein said first and third gates of said n sets receive first and third rotor position signals displaced by such a predetermined phase angle that the motor output torque at said predetermined speed when said first gates are enabled is approximately equal to that when said third gates are enabled, and wherein said means for selectively coupling is responsive to said speed signal for removing control signals from said first gates and for coupling control signals simultaneously to said third gates.

14. In the combination of claim 13 wherein said first and third rotor position signals are displaced by approximately 60 electrical degrees and effect motor torque angles of approximately 0° and approximately 60°, respectively.

15. In the combination of claim 1 wherein the corresponding logic gates of said n sets receive rotor position signal inputs displaced $360/n$ electrical degrees apart.

16. In the combination of claim 1 wherein each of said logic gates sets includes first and second logic gates, said first gates of said n sets receive time-displaced first rotor position signals and said second gates of said n sets receive time-displaced second rotor position signals inputs displaced by a predetermined phase angle from said first rotor position signals, and said means for selectively coupling includes means for selectively coupling control signals simultaneously to said first gates of said n logic gate sets and to said second gates of said n logic gate sets.

17. In the combination of claim 16 wherein said second time-displaced rotor position signals are displaced 180 electrical degrees from said first rotor position signals to thereby permit selective reversal of the direction of rotation of said rotor within said stator.

18. In the combination of claim 17 and including motor direction selecting means for selectively deriving forward and reverse signals, and wherein said means for selectively coupling includes means responsive to said forward and reverse signals for respectively coupling control signals simultaneously to said first gates of said n logic gate sets and to said second gates of said n logic gate sets.

19. In the combination of claim 18 wherein each of said logic gate sets includes a third gate, said third gates of said n sets receive time-displaced third rotor position signal inputs displaced by a predetermined phase angle from said first rotor position signals, and including means for deriving a speed signal when said motor rotor attains a predetermined angular velocity, and wherein said means for selectively coupling includes means responsive to generation of said speed signal when said forward signal is present for coupling control signals simultaneously to said third gates of said n sets of logic gates.

20. In the combination of claim 19 wherein each of said logic gate sets includes a fourth gate, said fourth gates of said n logic gate sets receive fourth rotor position signal inputs displaced by a predetermined phase angle from said second rotor position signal, and wherein said means for selectively coupling includes gate means responsive to derivation of said speed signal when said reverse signal is present for coupling control signals simultaneously to said fourth gates of said n sets of logic gates.

21. In the combination of claim 20 wherein said means for selectively coupling includes means responsive to reversal of said motor direction selecting means when both said forward and speed signals are present for removing control signals from said third gates and coupling control signals simultaneously to said second gates of said n logic gate sets to thereby brake said motor and also being responsive to reversal of said motor direction selecting means when both said speed and reverse signals are present for removing control signals from said fourth gates and coupling control signals simultaneously to said first gates of said n sets to thereby brake said motor.

22. In the combination of claim 19 and including means for deriving a brake signal, and wherein said means for selectively coupling includes means responsive to derivation of said brake signal when said speed signal is present to remove control signals from said third gates of said n sets and to couple control signals simultaneously to said second gates of said n sets of logic gates to thereby brake said motor.

23. In the combination of claim 19 wherein said means for generating magnetic poles in said rotor includes a field winding and field current regulating means responsive to said speed signal to supply current of predetermined magnitude to said field winding, whereby regenerative braking of said motor is possible.

24. In the combination of claim 15 having means including an adjustable element for selectively varying the power duty cycle of said semiconductors when they are enabled, and wherein said field current regulating means in the absence of said speed signal varies field current to said field winding as a function of the setting of said adjustable element so that said adjustable element simultaneously controls both field winding current and power duty cycle.

25. In the combination of claim 18 wherein said n logic gate sets also include third logic gates which receive third time-displaced rotor position signal inputs which are also displaced by a predetermined phase angle from said first rotor position signals to thereby permit variation of the torque angle of said motor when it is rotating in the forward direction and fourth logic gates which receive fourth time-diplaced rotor position signal inputs which are also displaced by a predetermined phase angle from said second rotor position signals to thereby permit variation of the torque angle of said motor when it is rotating in the reverse direction.

26. In the combination of claim 25 and including means for deriving a speed signal when said motor attains a predetermined speed, and wherein said means for selectively coupling includes gate means responsive to derivation of said speed signal when said forward and reverse signals respectively are present for coupling control signals simultaneously to said third gates and to said fourth gates.

27. In the combination of claim 26 and including means for selectively delaying initiation of conduction by said semiconductors within the period of said rotor position signals during which they are enabled.

28. In the combination of claim 26 wherein said means for generating magnetic poles in said rotor includes a field winding and field current regulating means for energizing said field winding and being responsive to said speed signal to supply a current of predetermined magnitude to said field winding, whereby said motor can be regeneratively braked when it is operating above said critical speed.

29. In the combination of claim 16 and including means for deriving a brake signal, and wherein said means for selectively coupling is responsive to said brake signal to remove control signals from said first gates and to couple control signals simultaneously to said second gates and said second rotor position signals are displaced by a predetermined phase angle from said first rotor position signals which effect a motor torque angle that reduces motor torque in comparison to that effected by said first rotor position signals.

30. In the combination of claim 1 wherein said n logic gate sets have first gates which receive first rotor position signals displaced 360/n electrical degrees apart, third logic gates which receive third rotor position signals displaced 360/n electrical degrees apart and also displaced by a predetermined phase angle from said first signals to thereby permit variation of the torque angle of said motor, and second logic gates which receive second rotor position signals displaced 360/n electrical degrees apart and also displaced 180 electrical egrees from said first signals to thereby permit reversal of the direction of rotation of said rotor within said stator.

31. In the combination of claim 30 and including means for deriving a speed signal when said rotor attains a predetermined angular velocity, and wherein said means for selectively coupling includes gate means responsive to said speed signal for coupling control signals simultaneously to said third gates of said n sets of logic gates.

32. In the combination of claim 31 and including motor direction selecting means for selectively deriving forward and reverse signals, and wherein said means for selectively coupling includes gate means responsive to said forward and reverse signals respectively in the absence of said speed signal to couple control signals simultaneously to said first gates of said n sets and to said second gates of said *n* sets.

33. In the combination of claim 32 wherein said n sets of logic gates also include fourth gates which receive fourth rotor position signal inputs displaced 360/n electrical degrees apart and also displaced by a preselected phase angle from said second rotor position signals such that the motor output torque at said predetermined angular velocity is approximately the same when said second gates are enabled and when said fourth gates are enabled, and said means for selectively coupling includes means responsive to the generation of said speed signal when said reverse signal is present for removing control signals from said second gates and simultaneously coupling control signals to said fourth gates of said *n* sets.

34. In the combination of claim 33 wherein said means for selectively coupling includes logic gate memory latch means receiving said forward, reverse and speed signals as inputs for permitting operation thereof in response to said forward and reverse signals in the absence of said speed signal and for, when said speed signal is present, removing control signals from said third gates and coupling control signals simultaneously to said second gates in response to operation of said direction selection means in a direction to derive said reverse signal to thereby regeneratively brake said motor.

35. An electronic commutation system for an electric motor having a plurality of stator windings and a rotor rotatable in response to energization of said stator windings, comprising
 a source of electrical power,
 a plurality of controllable semiconductors between said source of power and said stator windings operative to periodically connect and disconnect said stator windings in a predetermined sequence to said source of power so that said stator windings generate a rotating magnetic field,
 rotor position sensor means for deriving time-displaced, square wave rotor position signals at a frequency proportional to rotor angular velocity indicative of the instantaneous relative positions of said rotor and said stator windings,
 electronic commutation means including a plurality of logic gates associated with each of said stator windings receiving rotor position signals as inputs for sequentially enabling said semiconductors so that said stator windings generate a rotating magnetic field, the first gates of said plurality of gates receiving time-displaced first rotor position signals as inputs and the third gates thereof receiving time-displaced third rotor position signals as inputs that are also displaced by a predetermined angle from said first rotor position signals, said logic gates also receiving control signal inputs and being enabled when the rotor position and control signal inputs thereto occur simultaneously, and
 means for selectively coupling control signals simultaneously to corresponding logic gates, whereby the torque angle of said motor may be selectively varied.

36. An electronic commutation system in accordance with claim 35 wherein said motor has n stator windings, where n is an integer greater than one, said first rotor position signals are displaced 360/n electrical degrees apart and said third rotor position signals are displaced 360/n electrical degrees apart.

37. An electonic commutation system in accordance with claim 36 wherein the power output of said motor at a predetermined speed is approximately the same at a predetermined relatively low and at a predetermined relatively high motor torque angle, and wherein said first and third rotor position signals are displaced by the angle between said relatively high and relatively low motor torque angles.

38. An electronic commutation system in accordance with claim 37 and including means for generating a speed signal when said motor attains said predetermined speed, said means for selectively coupling is responsive to the absence of said speed signal to couple control signals simultaneously to said first gates and is responsive to said speed signal to couple control signals simultaneously to said third gates.

39. An electronic commutation system in accordance with claim 38 wherein the second logic gates of said plurality of gates receive time-displaced second rotor position signals displaced 180 electrical degrees from said first rotor position signals, whereby the direction of rotation of said motor may be selectively reversed.

40. An electronic commutation system for an electric motor in accordance with claim 38 and including motor direction selecting means for selectively deriving forward and reverse signals, and said means for selectively coupling includes means responsive to said forward and reverse signals in the absence of said speed signal or respectively coupling control signals simultaneously to said first gates and to said second gates.

41. An electronic commutation system for an electric motor in accordance with claim 40 wherein the fourth gates of said plurality of gates receive fourth rotor position signal inputs displaced by a predetermined phase angle from the second rotor position signals, and wherein said means for selectively coupling includes latch means responsive to derivation of said speed signal when said reverse signal is present for coupling control signals simultaneously to said fourth gates.

42. An electronic commutation system for an electric motor in accordance with claim 41 wherein said latch means includes means for deriving a brake signal when said speed signal is present and said motor direction selecting means is actuated in a direction to derive said reverse signal, and said means for selectively coupling is responsive to said brake signal to remove control signals from said third gates and to couple control signals simultaneously to said second gates to thereby brake said motor.

43. An electronic commutation system for an electric motor in accordance with claim 42 wherein said latch means also includes means responsive to said speed signal and actuation of said motor direction means in a direction to derive said forward signal for deriving said brake signal, and said means for selectively coupling is responsive to said brake signal to remove control signals from said fourth gates and couple control signals simultaneously to said first gates to thereby brake said motor.

44. An electronic commutation system for an electric motor in accordance with claim 35 wherein the motor output torque when said second gates are enabled is less than when third gates are enabled, and including means for deriving a brake signal, and wherein said means for selectively coupling includes means responsive to sake brake signal to remove control signals from said third gates and to couple control signals simultaneously to said second gates to thereby regeneratively brake said motor.

45. An electronic commutation system in accordance with claim 35 and including means for selectively varying the power duty cycle of said semiconductors during said rotor position signals.

46. An electronic commutation system in accordance with claim 45 wherein said rotor position sensor means generates square wave rotor position signals of 180 electrical degrees duration, said power duty cycle varying means includes means for turning said semiconductors on a plurality of time during the 180 electrical degree duration of said rotor position signals, and means for selectively varying the time said semiconductors carry current when they are turned on.

47. An electronic commutation system in accordance with claim 46 wherein said motor has at least *n* stator phase windings, where *n* is an integer greater than one, said rotor position sensor means generates *n* rotor position signals and their complements, said means for turning said semiconductors on a plurality of times includes synchronous pulse deriving means for generating a timing pulse at the leading edge of each rotor position signal, and said means for selectively varying the time said semiconductors carry current includes means for turning on a semiconductor after a time delay each time a timing pulse occurs and variable time delay means for selectively varying the time delay interval between the occurence of a timing pulse and initiation of current conduction by said semiconductor.

48. An electronic commutation system for an electric motor in accordance with claim 39 wherein said power duty cycle varying means includes a delay gating means associated with each said stator winding having its input coupled to the output of said plurality of gates and its output coupled to the associated semiconductor, and means for selectively adjusting the phase angle at which said delay gating means are opened during said rotor position signals.

49. An electronic commutation system for an electric motor in accordance with claim 48 wherein said means for adjusting the phase angle at which said delay gating means are opened includes means for generating a plurality of timing pulses during each of said rotor position signals, means for generating a delay pulse from each of said timing pulses after a predetermined time delay, means for selectively varying said time delay between said timing and delay pulses, and means for opening said delay gating means during each of said delay pulses.

50. An electronic commutation system for an electric motor in accordance with claim 49 wherein said motor has at least *n* sator windings, where *n* is an integer greater than one, and said rotor position signal deriving means generates *n* rotor position signals of approximately 180 electrical degrees duration displaced 360/*n* electrical degrees apart and their complements and said timing pulse generating means derives a timing pulse at the leading edge of each of said rotor position signals.

51. In the combination of claim 35 wherein said means for sequentially enabling said semiconductors includes NAND gate means associated with each stator winding receiving the outputs of the associated plurality of logic gates for deriving an enabling signal for the associated semiconductor.

52. An electronic commutation system for an electric motor in accordance with claim 51 wherein each stator winding has a center tap, and two controllable semiconductors are associated with each stator winding each of which is connected in series with said source and one of said stator winding halves so that the magnetic fluxes generated by the winding halves of each stator winding are in opposite directions, said semiconductor enabling signal being coupled to one of the semiconductors associated with each stator winding through a NOT gate so that it is enabled by the inverse of the signal which enables the other semiconductor associated with said stator winding, whereby said stator winding halves operate in push-pull.

* * * * *

PO-1050
(5/69)

UNITED STATES PATENT OFFICE
CERTIFICATE OF CORRECTION

Patent No. 3,784,888    Dated January 8, 1974

Inventor(s) Allois F. Geiersbach and Frederick A. Stich

It is certified that error appears in the above-identified patent and that said Letters Patent are hereby corrected as shown below:

In the Abstract, line 25, "delays" should read --- delay, ---. Column 28, line 41, "aid" should read --- said ---. Column 33, line 11, "sake" should read --- said ---; line 24, "time" should read --- times ---; line 41, "occurence" should read --- occurrence ---.

Signed and sealed this 4th day of June 1974.

(SEAL)
Attest:

EDWARD M. FLETCHER, JR.
Attesting Officer

C. MARSHALL DANN
Commissioner of Patents